March 9, 1954
C. A. NERACHER
2,671,351
ELECTRICALLY OPERATED GEAR SHIFT AND CLUTCH
CONTROL MECHANISM FOR TRANSMISSIONS
Filed Dec. 19, 1949
6 Sheets-Sheet 2
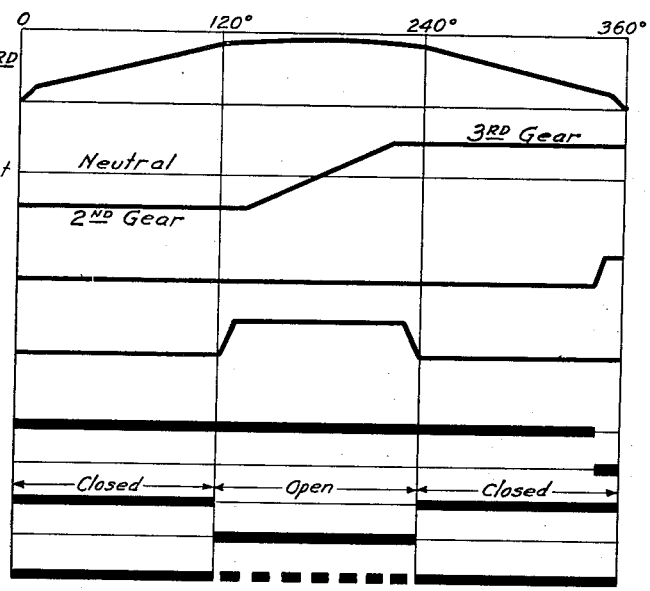
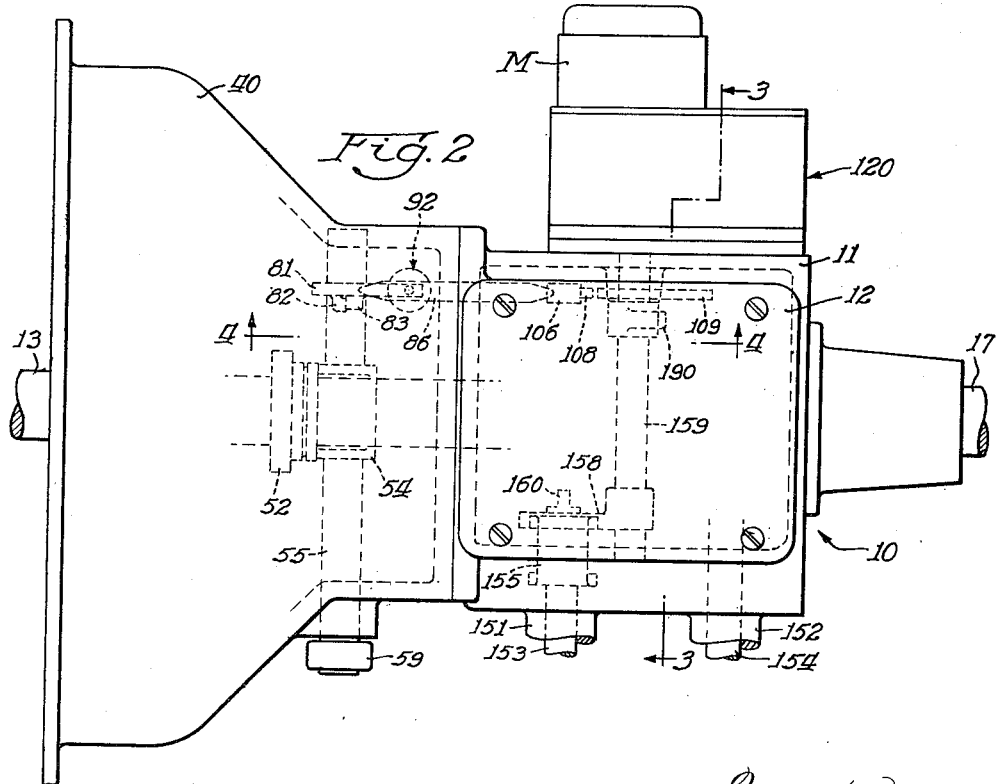

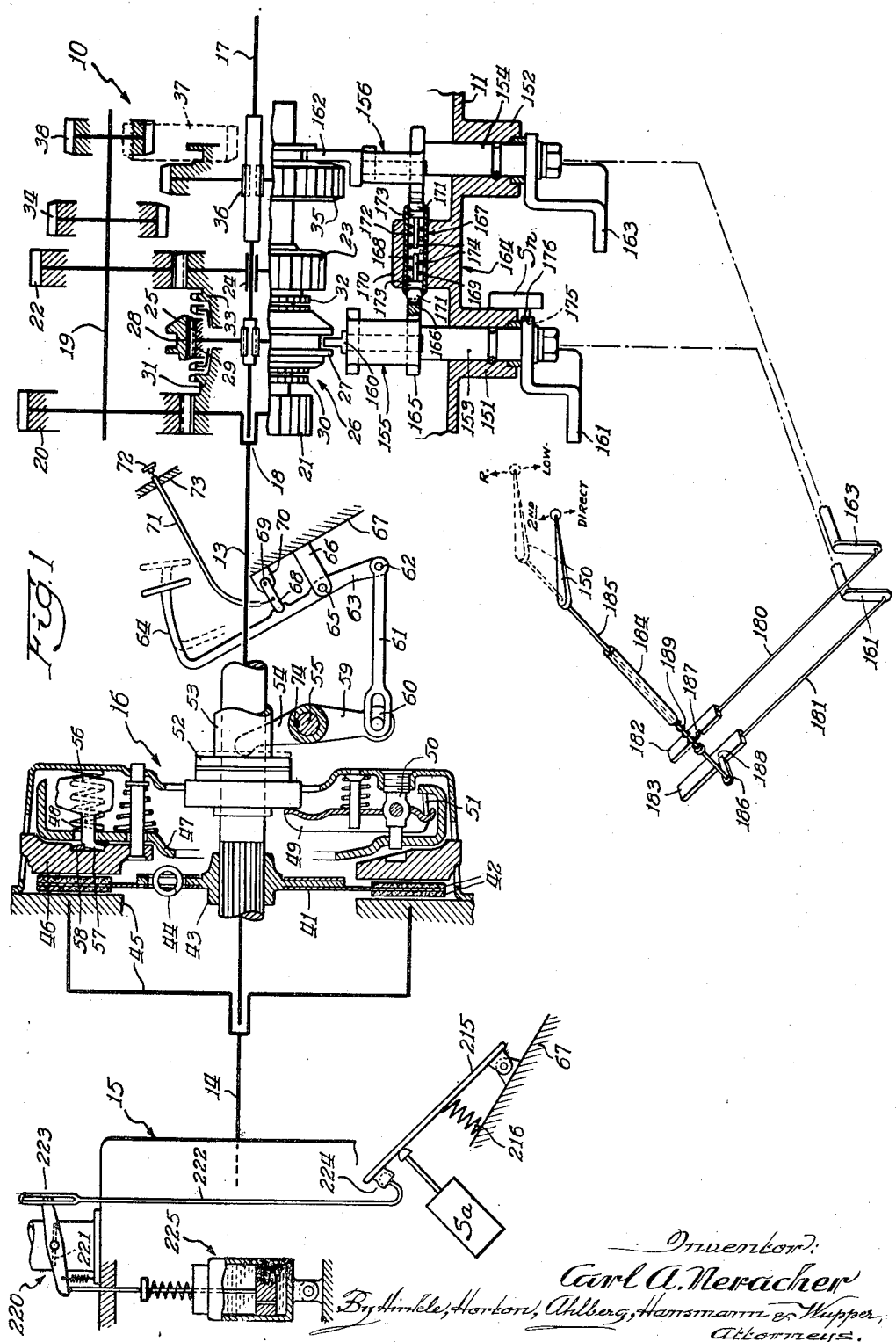

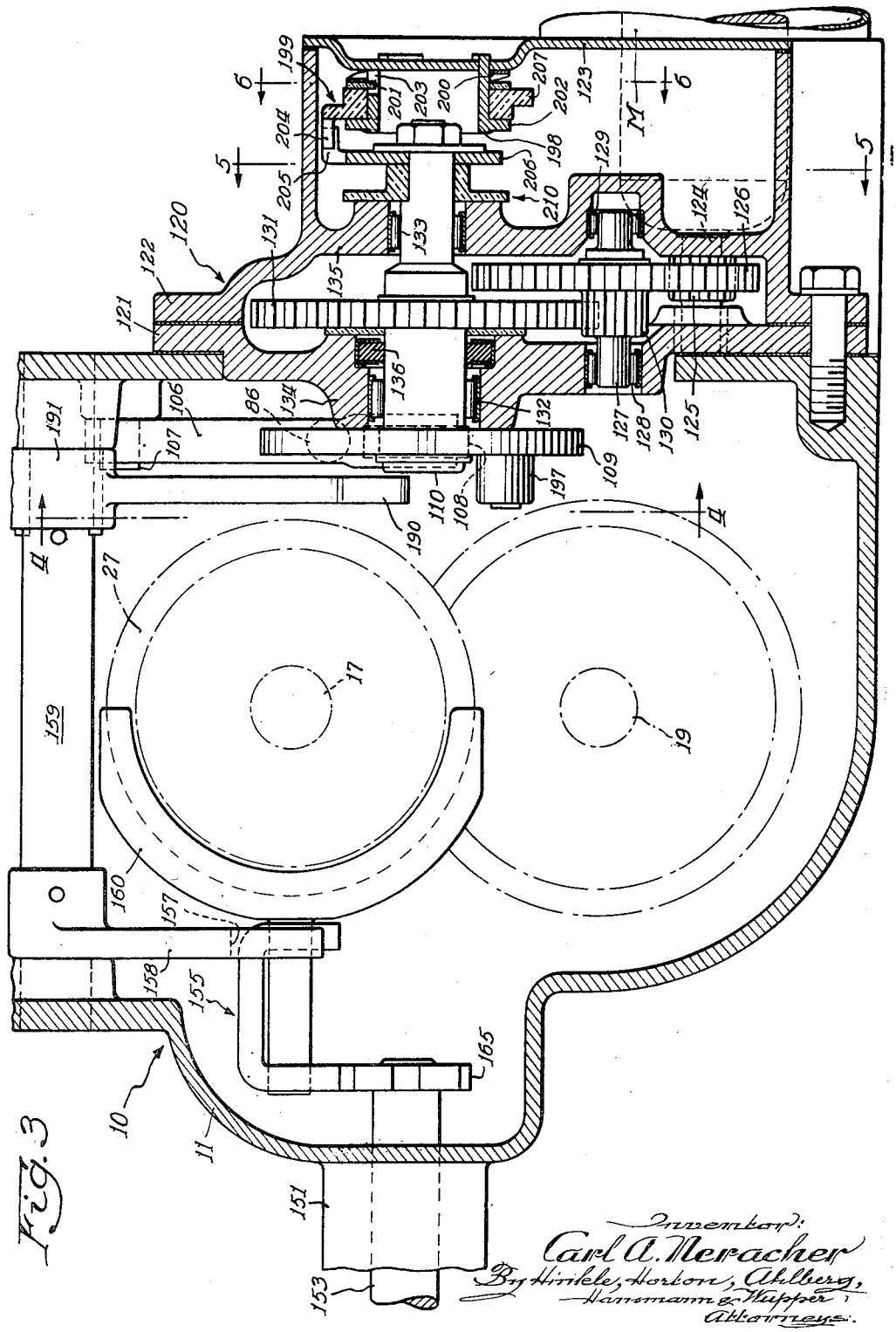

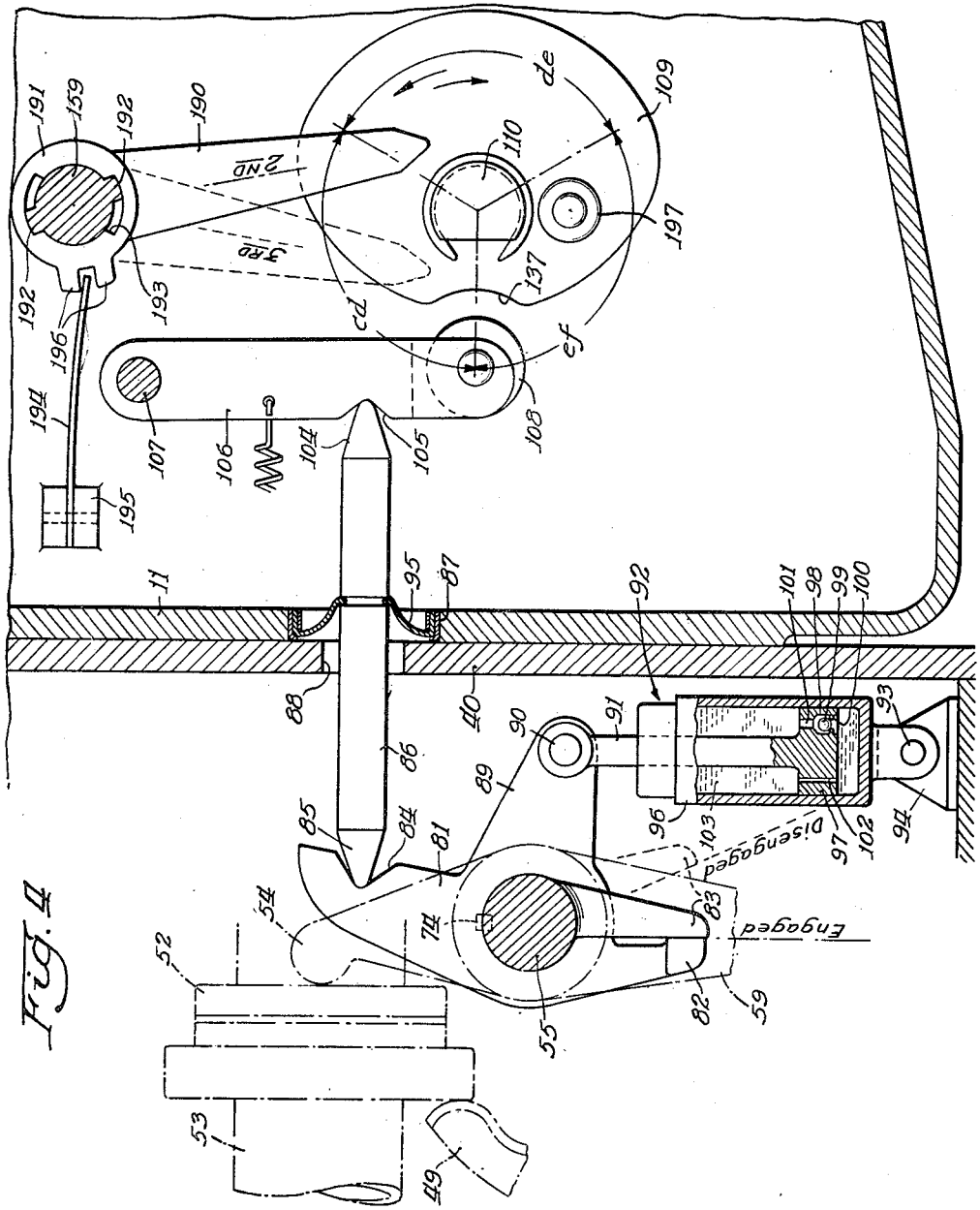

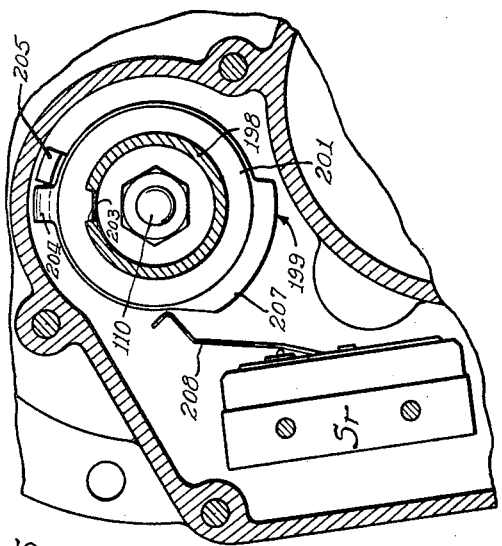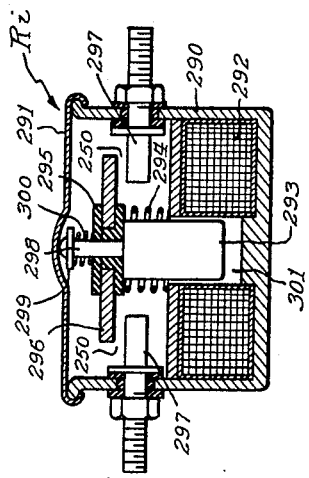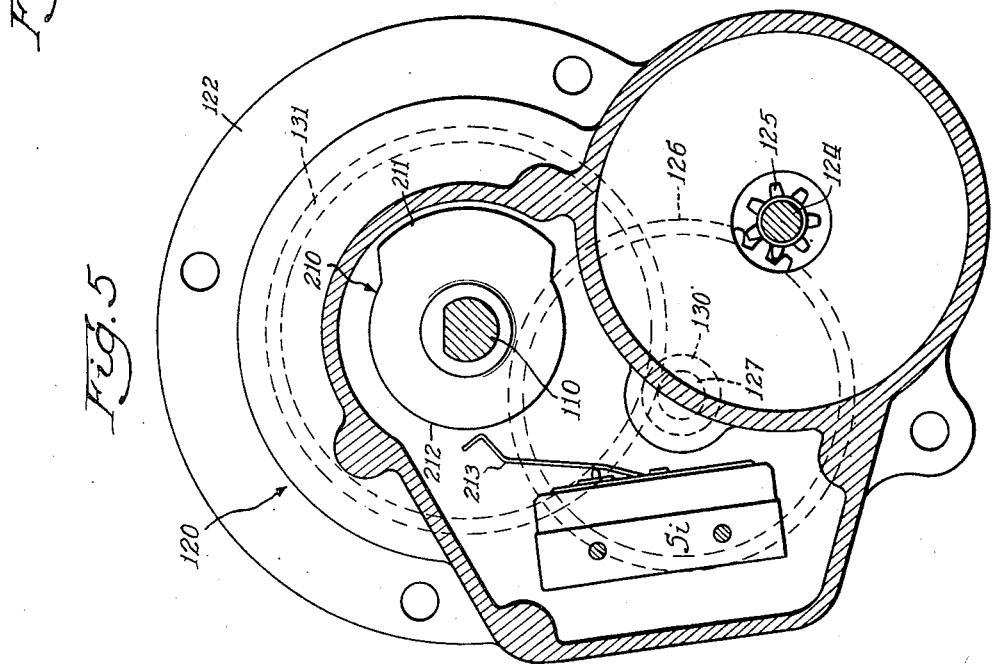

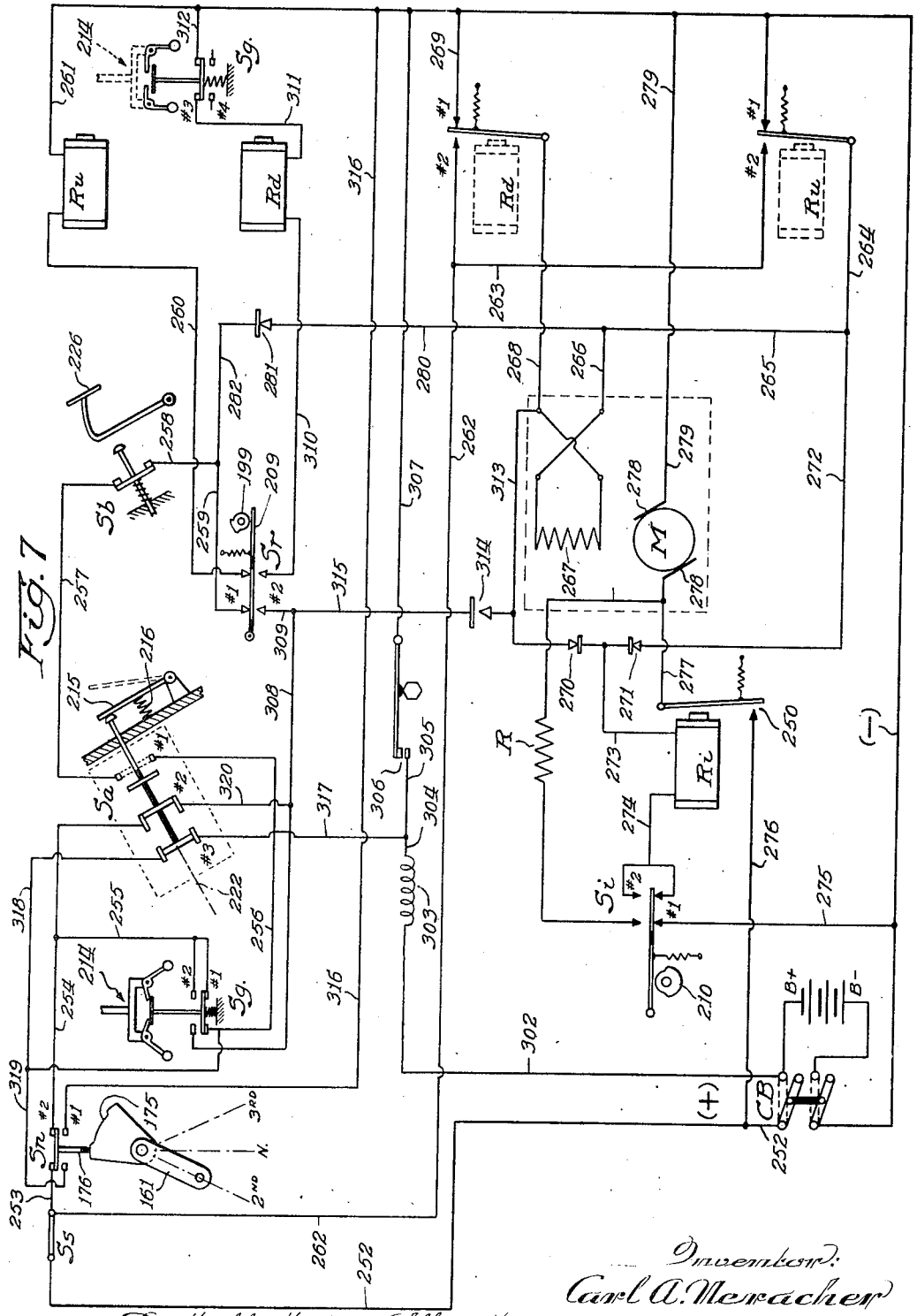

Patented Mar. 9, 1954

2,671,351

UNITED STATES PATENT OFFICE 2,671,351

ELECTRICALLY OPERATED GEAR SHIFT AND CLUTCH CONTROL MECHANISM FOR TRANSMISSIONS

Carl A. Neracher, Santa Ana, Calif.

Application December 19, 1949, Serial No. 133,846

57 Claims. (Cl. 74—472)

The present invention relates to gear shifting mechanism and more particularly to an automatic control mechanism whereby a change-speed gear device as, for example, an automotive transmission, may be shifted between two different conditions representing different speed ratios, the mechanism operating under the influence of vehicle driving conditions, principally as they affect the speed of the transmission driven shaft and consequently of the vehicle to effect either an up-shift or a down-shift, as the case may be.

Still more specifically, the invention relates to a control mechanism of this type wherein the actual shift of the change-speed gear device is effected by the positive application to the shifting element, per se, (which may be the shift fork of a more or less conventional transmission) of a power-initiated force or thrust in which the source of power is derived from an electric motor which, in turn, derives its energizing current from the usual battery employed in the vehicle for ignition and other purposes.

The control mechanism per se is, in the main, of an electrical nature and while it is, as stated above, responsive to the speed of rotation of the output or driven shaft of the transmission for effecting either an up-shift or a down-shift, it is also responsive to voluntary acts of control on the part of the driver of the vehicle to effect such shifts when they are deemed to be required by the driver.

While the present invention is capable of use in connection with a large variety of transmissions having a shiftable element for effecting the desired changes in gear ratio, it is also applicable to existing transmissions which, by a conversion process, may be adapted for such automatic shifting as outlined above.

In either case, the invention has for its general object the provision of an automotive transmission which relieves the driver of the vehicle of much of the clutch pedal and gear shift operations that are ordinarily associated with standard transmissions.

Briefly, the invention involves in its general organization a cyclicly operable mechanism including a clutch throw-out cam and a gear shift cam, the two cams being mounted for rotation in unison on a cam shaft. The clutch throw-out cam is operatively connected by a suitable linkage to the clutch mechanism of the vehicle for clutch throw-out and clutch re-entry operations. The gear shift cam is likewise operatively connected by a suitable linkage to the movable gear shift element of the transmission for effecting up-shift and down-shift operations as desired.

The cam shaft upon which the two cams are disposed is mounted for alternate rotation in opposite directions throughout one complete revolution during each cycle to effect an up-shift of the transmission gearing in one case and a down-shift thereof in the other.

A reversible electric motor is operatively geared to the cam shaft and a reversible switch assembly is provided for reversing the direction of flow of current through the field windings of the motor to thereby determine the direction of rotation of the motor. The reversing switch operates under the control of a third or reversing switch cam, through suitable relay control mechanism to effect opening of the motor circuit at the end of each shift cycle or complete revolution of the cam shaft in either direction to stop the motor, and also to prepare the motor circuit for subsequent energization and consequent operation of the motor in the opposite direction when the next shift cycle is in order.

During each shift cycle, regardless of whether an up-shift or a down-shift of the transmission is to be performed, a complete revolution of the clutch throw-out and re-entry cam and of the gear shift cam causes these two cams to operate and perform their respective functions in timed relationship to each other to produce a gear shifting operation which substantially duplicates the functions manually performed by the driver of a vehicle as regards clutch throw-out, gear shifting and subsequent clutch re-entry operations making use of the usual clutch pedal and gear shift lever of a standard transmission.

Among the electrical controls involved in connection with the present invention is a selector switch which may be conditioned for either manual or automatic operation of the vehicle transmission. The usual manual shift lever of the transmission is left intact and during automatic operation of the transmission, this lever will be observed to move automatically according to each gear shift operation so that the driver may be appraised of the particular gear ratio under which the vehicle is operating. A governor associated with the output or driven shaft of the transmission determines the speed at which the automatic gear shifting operations shall take place. The governor also operates to prevent down-shifting operations which ordinarily would take place upon a full depression of the accelerator pedal when the vehicle is moving at speeds which would render such a down-shift ineffective to provide the desired vehicle acceleration.

A centrifugal clutch or its functional equivalent is employed with the transmission in order that upon braking the vehicle to a stop, and during normal idling of the motor with the vehicle at a standstill, it is unnecessary to de-clutch the engine from the transmission or to shift the transmission into neutral.

The electrical controls also include a so-called automatic "kickdown" in the form of a suitable switch mechanism which goes into effect upon depression of the accelerator pedal beyond its wide open throttle position. This automatic kickdown arrangement permits a down-shift of the transmission, with consequent immediate acceleration of the vehicle, when the vehicle is traveling at a rate which is higher than the predetermined speed at which the governor is set. Since this throttle kickdown is useful only at relatively low speeds, means are provided for rendering the electrical controls ineffective to obtain the kickdown above predetermined high vehicle speeds.

One of the important features of the invention resides in a means whereby during that portion of each shift cycle or complete revolution of the cam shaft during which the actual gear shift takes place, the speed of rotation of the reversible electric control motor may be reduced without affecting its torque application. In this manner, full motor power and speed are available for rapid clutch disengagement, but the motor speed is reduced during the actual gear shifting operation so that a slow and positive gear shift is effected. Full motor speed is restored during the clutch re-engagement portion of the gear shift cycle. The specific means employed for reducing the motor speed consists of a vibrating magnetic relay device which interrupts the flow of armature current to the motor intermittently. Such intermittent application of force to the movable gear shifting unit of the transmission effects an extremely smooth yet powerful gear shift operation and involves less wear and tear on any synchronizing devices which may be employed in connection with the transmission. In other words, because the synchronizing force is intermittently relieved, the clutch teeth which are to be synchronized are constantly moving to slightly different positions relative to each other. Such intermittent application of force to the movable gear shifting unit of the transmission also prevents deadending of the meshable clutch teeth.

The electrical controls associated with the present invention also include a neutral switch which operates to prevent the electrical control system from going into effect to attempt a gear shifting operation when the transmission is in its neutral condition, in reverse, or in any other gear ratio from which automatic shifting is not contemplated.

Numerous other driving and operation contingencies are accommodated by the present invention and these will be described subsequently. For example, the invention contemplates the provision of a control knob for engaging the clutch of the vehicle when the engine is not running, in order that the vehicle may be pushed to start the engine or that the engine may be used as a brake when parking. Additional means are provided for preventing an up-shift of the vehicle during the application of braking torque thereto.

Still other features of the present invention which will be described subsequently are a means to provide manual emergency clutch re-engagement in the event that failure of the electrical system occurs when the clutch is disengaged, and a throttle dashpot device which is inserted in the carburetor throttle linkage so that the speed of throttle closure is rearded as it approaches closed throttle position to prevent the engine from decelerating too rapidly during the interval that the clutch is disengaged and so that the engine will not act initially as a brake on the vehicle and cause an objectionable negative lurch at the commencement of a shift cycle.

Yet another object of the invention is the provision of a means for grounding the primary coil of the ignition system of the vehicle or otherwise rendering the system inoperative to produce an electrical discharge or spark at the terminals of the engine spark plugs during that portion of the gear shift cycle when the clutch is disengaged and the transmission passes through its neutral condition. By such an arrangement the engine is prevented from racing if the throttle happens to be fairly wide open during a transmission down-shift. Additionally, forward lurching of the vehicle is prevented at the time clutch re-entry operations take place during the shift cycle.

The provision of an electrical control arrangement of the type briefly outlined above being the principal object of the invention, other objects and advantages thereof will become more apparent as the nature of the invention is better understood.

In the accompanying six sheets of drawings which form a part of this specification:

Fig. 1 is a schematic view showing a transmission operatively associated with a clutch mechanism and also showing the manner in which the transmission and clutch mechanism are associated with the control mechanism comprising the present invention; in this view, the shifting forks and countershaft are shown displaced 90° and 180° respectively from their true positions in the vehicle transmission;

Fig. 2 is a top plan view of the assembled transmission housing and clutch bell housing and showing the control mechanism of the present invention applied thereto;

Fig. 3 is a sectional view taken substantially along the line 3—3 of Fig. 2 in the direction indicated by the arrows;

Fig. 4 is a sectional view taken substantially along the line 4—4 of Fig. 2 in the direction indicated by the arrows;

Fig. 5 is a sectional view taken substantially along the line 5—5 of Fig. 3 in the direction indicated by the arrows;

Fig. 6 is a fragmentary sectional view taken substantially along the line 6—6 of Fig. 3 in the direction indicated by the arrows;

Fig. 7 is an electrical circuit diagram for the electrical control instrumentalities of the present invention;

Fig. 8 is a time chart of the electrical control devices employed in connection with the present invention; and Fig. 9 is a sectional view taken substantially centrally through a relay magnet employed in connection with the present invention.

In all of the above-described views, like characters of reference are employed to designate like parts throughout.

Referring now to the drawings in detail and in particular to Figs. 1 and 2, a transmission capable of being operated by the cyclicly operable control mechanism of the present invention is schematically shown in Fig. 1 at 10 and is provided with the usual casing 11 (Fig. 2) having a removable cover plate 12. This transmission will accommodate three forward gear ratios and one reverse gear ratio. The transmission per se includes a driving shaft 13 operatively connected to the crank shaft 14 of the motor vehicle engine 15 through a clutch mechanism designated in its entirety at 16. The driven shaft 17 of the transmission is piloted as at 18 in the rear end of the driving shaft 13 and this driven shaft is adapted to be operatively connected to the drive wheels of the vehicle (not shown) with which the transmission is associated. A countershaft 19 is provided below the driven shaft 17 and carries a gear 20 which meshes with a gear 21 mounted on the driving shaft 13, these two gears being in constant mesh with each other. The countershaft 19 is shown in Fig. 1 as being displaced 90° from its usual position below the driving shaft 13. The countershaft 19 also carries a gear 22 which is in constant mesh with a gear 23 mounted on a sleeve 24 which is rotatably disposed on the driven shaft 17. A hub 25 is fixed on the driven shaft 17 and forms part of a speed shift and synchronizing device in the form of a positive dual clutch assembly designated in its entirety at 26. A sliding shift collar 27 having internal splines 28 meshing with external splines 29 formed on the hub 25 is designed for selective engagement with a series of teeth 30 provided on a hub 31 forming a part of the gear 21 or with a series of teeth 32 formed on a hub 33 forming part of the gear 23. It will be seen, therefore, that when the shift collar 27 is moved from its neutral position as shown in Fig. 1 to its extreme left-hand position, the internal splines 28 thereof will engage the teeth 30 of the hub 31 and operatively connect the gear 21 to the driven shaft 17 to establish a direct drive from the driving shaft 13 to the driven shaft 17. Similarly, when the shift collar 27 is moved to its extreme right-hand position so that the internal splines 28 thereof engage the teeth 32 on the hub 33 of the gear 23, this latter gear will be operatively connected to the driven shaft 17 so that an intermediate gear ratio will obtain between the driving and driven shafts, the train of gears for effecting such gear ratio constituting the gears 21 and 20, the countershaft 19, gears 22 and 23, shift collar 27 and hub 25.

The electrical control mechanism comprising the present invention is adapted to automatically effect movement of the shift collar 27 to establish either an up-shift or a down-shift between second speed gear ratio and third or direct speed gear ratio as will be described hereinafter. However, the transmission 10 is capable of being shifted into a low speed gear ratio by a manual operation, if desired, and toward this end a gear 34 mounted on the countershaft 19 is capable of meshing with a gear 35 which is splined as at 36 to the driven shaft 17 and which is slidable axially of the latter into and out of engagement with the gear 34. The gear 35 is also capable of being placed in mesh with an idler gear 37 which meshes with a gear 38 mounted on the countershaft 19 to establish a reverse speed gear ratio when occasion demands.

The transmission 10 just described is merely exemplary of one form of transmission that may be employed for control by the mechanical and electrical instrumentalities which cooperate to make up the present invention, and it will be understood that other forms of transmissions having a shiftable member movable between two positions in opposite directions to effect an up-shift and a down-shift are contemplated. The transmission 10 is operatively associated with the clutch mechanism 16 and this latter assembly is preferably in the form of a centrifugal clutch which remains disengaged at relatively low engine speeds and which is adapted to automatically become engaged when a predetermined engine speed is attained.

The clutch diagrammatically shown in Fig. 1 is provided with a housing 40 (Fig. 2) and includes a driven disc 41 carrying friction facings 42 and mounted on a hub 43 through a torque cushioning drive including springs 44. The disc 41 is disposed between the rear face of the engine flywheel 45 and an axially movable pressure plate 46, which plate is advanced toward the flywheel to take up running clearances and clamp the driven disc against the flywheel to transmit power therefrom to the clutch driven shaft 13 which forms the driving shaft of the transmission 10. The pressure plate 46 is backed by a spring mounting ring 47 which in turn is backed by a plurality of preloaded pressure springs 48, the total load of which determines the maximum clutch engaging pressure. The ring 47 is normally held in the position shown in Fig. 1 by throw-out fingers 49 carried on mounting studs 50 and having links 51 connected to the mounting ring 47. The inner ends of the fingers 49 normally contact and follow a throw-out collar 52 slidable on a sleeve 53 enveloping the shaft 13. The throw-out collar 52 is backed by a throw-out fork 54 (see also Fig. 4) mounted on a shaft 55 and when the collar is held in the position of Fig. 1, it acts through the multiplying leverage of the throw-out fingers 49 to hold the mounting ring retracted.

A series of weights 56 are nested within the mounting ring 47 and carry offset lugs 57 which are interposed between the pressure plate and the mounting ring, these lugs passing through slots formed in the latter. The lugs 57 form fulcrums for the weights and bear against hardened steel inserts 58 on the pressure plate. Outward movement of the weights 56 due to centrifugal force acts to pry the pressure plate and mounting ring apart, the pressure plate moving to the left until running clearances are taken up, after which additional outward movement of the weights 56 causes pressure to be applied to the friction facings 42 of the disc 41 to force the friction facings against the flywheel 45 and transmit the motion of the latter to the driving shaft 13 of the transmission 10.

The above description of the clutch mechanism 16 is sufficient for descriptive purposes of this application. However, for a more detailed description of the centrifugal clutch mechanism 16 reference may be had to the patent to Gamble, No. 2,070,892, dated February 16, 1937, for an automatic clutch.

Upon rotation of the clutch at a predetermined speed, the several weights 56 will be thrown radially outward by centrifugal force, thus applying a force through the offset lugs 57 about their fulcrum points tending to pry the pressure plate 46 away from the spring mounting rings 47 and into contact with the driven disc 41. After running clearances have been taken up, the final portion of the outward swing of the weights acts to shift the spring mounting ring 47 to the right, transferring the pressure spring load to the pressure plate. The clutch 16 is shown in what is known as its "idle released" position wherein the pressure plate 46 and driven disc 41 present a slight clearance. In this position, the clutch is disengaged. Any movement of the pressure plate 46 to the left, whether it be by virtue of the centrifugal action of the weights 56 as previously described or whether it be by virtue of the throw-out fork 54, will tend to engage the clutch. The throw-out collar 52 normally assumes the full line position shown in Fig. 1 and its movement to the right along the sleeve 53 is limited by the position of the throw-out fork 54. The throw-out fork 54 is fixed to the shaft 55 as previously described, and the shaft 55 has mounted thereon exteriorly of the clutch housing 40 (Fig. 2) a depending lever 59 having a pin and slot connection 60 with a link 61 pivoted as at 62 to the lower end 63 of the vehicle clutch pedal 64. The clutch pedal 64 is pivoted as at 65 to a bracket 66 suitably secured to the forward or outer side of the vehicle floorboard 67. A finger 68 is pivoted at 69 to a bracket 70 likewise secured to the forward side of the vehicle floorboard and is adapted to bear against one side of the clutch pedal 64 to limit its rearward movement to the position shown in full lines. With the clutch pedal 64 in this position, the lost motion of the link 61 is completely taken up by the pressure of the collar 52 against the throw-out fork 54. The throw-out collar 52 is capable of slight movement to the right to the position thereof shown in dotted lines. The finger 68 is connected to one end of a Bowden wire assembly 71 having associated therewith a manual control knob 72 positioned adjacent the instrument panel 73. The operator of the vehicle may move the control knob 72 in order to swing the finger 68 out of the path of movement of the clutch pedal 64, thus allowing the clutch pedal to move upwardly slightly to its dotted line position and in so moving, the link 61 is moved slightly to the left to allow the throw-out fork 54 to release the throw-out collar 52 and permit the latter to assume its dotted line position wherein the clutch is engaged under the influence of the springs 48. The clutch is then engaged while the centrifugal weights are inactive, thus permitting clutch engagement with a dead engine. In this condition of the clutch, it is possible to start the engine by pushing the vehicle.

It has been stated above that in the position shown in Fig. 1, the clutch may be said to be in its "idle released" position. By the term "idle released" is meant a condition of the clutch mechanism wherein the weights 56 are inactive and the clutch pedal 64 is released by the foot of the operator so that its movement is limited by the end of the finger 68. The positions of the spring mounting ring 47 and pressure plate 46 are such that the friction facings 42 do not quite touch the flywheel 45 and pressure plate 46 and therefore the clutch actually is disengaged, but is conditioned for immediate engagement when the accelerator pedal is depressed and the engine driving shaft 14 commences to accelerate to energize the weights 56.

It will be appreciated that whenever a transmission up-shift or down-shift is made, whether the shift be of a manual nature or whether it be an automatic shift in accordance with the principles of the present invention, it will be necessary that the clutch 16 be disengaged immediately prior to and during a shift and that after the shift has been accomplished, in order for the same to take effect, the clutch will have to be re-engaged. According to the present invention, automatic disengagement of the clutch immediately prior to a gear shift operation and re-entry thereof after the gear shift operation has been completed is accomplished by mechanism best illustrated in Fig. 4.

Referring now to Fig. 4, the previously described throw-out fork 54 is keyed as at 74 to the shaft 55 and the upper end thereof normally bears against the throw-out collar 52. The shaft 55 also has loosely mounted thereon a rocker element 81, the lower end of which is provided with an extension 82 adapted to bear against a finger 83 integrally formed on the shaft 55. The upper end of the rocker element 81 is provided with a notch 84 into which there extends the pointed end 85 of a thrust rod 86 which passes through an opening 87 formed in the front face of the transmission casing 11 and also through an opening 88 in the rear wall of the clutch housing 40. The rocker element 81 is provided with an offset extension 89, the extreme outer end of which is connected as at 90 to the plunger 91 of a one-way clutch re-entry dashpot assembly 92, the latter being anchored as at 93 to a bracket 94 suitably mounted on a portion of the clutch housing 40. The two openings in the rear wall of the clutch housing 40 and in the front wall of the transmission casing 11 are in alignment and a flexible diaphragm 95 secured to the thrust rod 86 and to the inner edge of the opening 87 provided in the front wall of the transmission casing 11 serves to prevent egress of oil from the latter.

The clutch re-entry dashpot 92 is of the single acting type and is provided for the purpose of slowing down the re-engagement of the clutch after a transmission up-shift or a transmission down-shift has been effected. The dashpot assembly 92 is of more or less conventional design and includes an outer casing or cylinder 96 having slidably disposed therein a piston 97 integrally formed with the plunger 91. The piston 97 is formed with a recess 98 therein in which there is disposed a ball valve 99 which normally rests by gravity on a retaining spider 100. The recess 98 communicates with a bore 101 which in turn communicates with the upper regions of the cylinder 96 above the piston 97. A bleeder port 102 extends through the piston 97. A suitable fluid 103 which may be oil is contained within the cylinder 96. From the above description of parts, it will be seen that substantially free movement of the piston 97 and plunger 91 upwardly may obtain, but downward movement of this piston and plunger assembly is restricted by the ball valve 99 which, when the piston moves downwardly, is forced against its seat within the recess 98 due to the action of the oil attempting to pass through the recess 98 and bore 101, thus limiting the downward movement of the piston to that which is permitted by virtue of the oil passing through the bleeder port 102. It will also be seen that clutch disengagement by movement of the thrust rod 86 to the left as shown in Fig. 4 may be a rapid one while clutch re-entry operations are restricted by virtue of the action of the dashpot 92.

The other pointed end 104 of the thrust rod 86 extends into a notch 105 provided in a cam follower 106 which is pivoted on a stud 107 mounted interiorly of the transmission casing 11.

The cam follower 106 carries a roller 108 at its free end designed for cooperation with a clutch throw-out cam 109 mounted on and keyed to a cam shaft 110 rotatably mounted in and carried by a motor drive and reduction gear unit or assembly designated in its entirety in Figs. 2, 3 and 5 at 120.

The motor drive and gear reduction assembly 120 is bolted to the transmission casing 11, and includes casing sections 121 and 122, the latter being provided with a cover plate 123. An electric motor M projects into the casing section 122 and is provided with a motor shaft 124 which projects through the casing section 122 and has a gear 125 mounted thereon. The gear 125 meshes with a large gear 126 mounted on a shaft 127 rotatably journaled in anti-friction bearings 128 and 129 carried by the casing sections 121 and 122 respectively. The gear 126 has integrally formed therewith a smaller gear 130 which meshes with a large gear 131 secured to the cam shaft 110.

From the above description, it will be seen that the gears 125, 126, 130 and 131 constitute a gear reduction train whereby the speed of rotation of the motor shaft 124 is transmitted to the cam shaft 110 at a greatly reduced rate of turning movement.

The cam shaft 110 is rotatably supported within the casing sections 121 and 122 in anti-friction bearings 132 and 133, the former being disposed within a hub 134 on the casing section 121 and the latter being disposed wthin an internal web 135 formed in the casing section 122. A seal 136 prevents egress of oil from the transmission casing 11 into the interior of the motor drive and gear reduction assembly 120.

The motor M is preferably of the direct current shunt wound reversing type and, as will be described presently, is cyclicly operable to rotate the cam shaft 110 successively throughout one complete revolution in opposite directions for the purpose of effecting alternate up-shifts and down-shifts of the transmission gearing.

Rotation of the cam shaft 110 and consequently of the clutch cam 109 throughout substantially 360° in either direction causes an early clutch disengagement at the commencement of the shift cycle and a subsequent clutch re-entry operation toward the close of the cycle, as is customary during manual driver control of the vehicle utilizing the gear shift lever for the gear ratio changing operations.

Accordingly, the cam 109 is provided with a region of low eccentricity on one side thereof which merges in both peripheral directions into a region of high eccentricity. A region of lowest eccentricity is afforded by means of an arcuate groove 137 which, when the cam is in its normal position, occupies a position in close proximity to the cam follower roller 108 for purposes which will be made clear presently. The normal clutch spring mechanism employed in connection with the clutch proper including the spring 48 serves normally to urge the roller 108 of the cam follower toward the periphery of the cam and when this follower assumes the position shown in Fig. 4, the clutch 16 is in its idle released position when the engine 15 is idling or is engaged when the engine is operating above idling speed.

In the "idle released" position of the clutch as shown in Fig. 1, the clutch pedal 64 bears against the end of the finger 68 and the solid clutch linkage leading from the finger 68 back through the thrust rod 86 to the cam follower 106 causes the follower roller 108 to assume the position shown in Fig. 4 wherein it is out of engagement with the surface of the cam 109 but is capable of moving into engagement with this surface in the region of the groove 137 when the finger 69 is withdrawn from the path of movement of the clutch pedal 64 by means of the Bowden wire 71. This arcuate depression 137 permits the clutch to be fully engaged in the manner previously described for the purpose of permitting the engine to be started by pushing the vehicle. With the follower 106 in the position shown in Fig. 4, the clutch is in its "idle released" position providing, of course, that the rotational speed of the shaft 14 is insufficient to energize the weights 56. Rotation of the cam 109 in a counter-clockwise direction as indicated by the outer arrow in this figure throughout approximately 120° serves to effect a gradual clutch disengagement, this disengagement being represented by the sector labeled cd. During movement of the cam from its point of low eccentricity to a point of high eccentricity wherein a surface of the cam 120° removed from the point of lowest eccentricity of the cam is in engagement with the roller 108, the cam follower is forced in a clockwise direction as shown in Fig. 4 to cause the thrust rod 86 to move to the left and rock the rocker element 81 in a counter-clockwise direction and move the extension 82, and consequently the finger 83, to thus cause the shaft 55 to rotate in a counter-clockwise direction. Upon such counter-clockwise rotation of the shaft 55, the throw-out fork 54 bears against the throw-out collar 52 and causes the same to move on the sleeve 53 to the left as shown in Fig. 4 and thus cause clutch disengagement in the manner previously described.

From the above description, it will be seen that during approximately the first 120° of each upshift cycle, clutch disengaging operations take place. During the next succeeding one-third cycle of the gear shifting operations, the actual transmission shift takes place while the clutch remains disengaged by virtue of the cam roller 108 traveling upon a high region of the clutch cam 109 as represented by the sector designated de. During the last third of the gear shift cycle while the roller 108 travels on the sector ef of the cam 109, clutch re-entry operations will take place by virtue of the roller 108 riding inwardly on a low portion of the cam 109 and causing the follower arm 106 to move in a counter-clockwise direction, thus permitting the thrust rod 86 to move to the right to in turn permit the rocker element 81 and shaft 55 on which it is mounted to move in a clockwise direction. Such clockwise movement of the shaft 55 causes the throw-out fork 54 to swing in a clockwise direction and permit backing off of the throw-out collar 52 and consequent clutch re-entry as previously described. During such clutch re-entry operations, the dashpot assembly 92 serves to retard the speed of such clutch re-entry operations.

As previously stated, the actual speed ratio changing operation to effect either an up-shift or a down-shift by movement of the collar 27 (Fig. 1) to the right or to the left, as the case may be, may be effected manually or it may be an automatic operation which occurs during a portion of the shift cycle while the clutch 16 remains disengaged. For manual shift operations the usual gear shift lever 150 is provided, this lever being capable of selective operation to control the shifting movements of the shift collar 27 and of the shiftable gear 35 associated with the transmission 10.

Referring now to Figs. 1, 2 and 3, the side wall of the transmission casing 11 is provided with a pair of bearing bosses 151, 152 through which the shaft portions 153, 154 of a pair of shifting crank arms 155 and 156 respectively extend. The crank arm 155 extends into a slot 157 (Fig. 3) provided in a cooperating crank arm 158 mounted on a transverse shaft 159 extending across the transmission casing. The crank arm 155 carries a shift fork 160 which cooperates with the shift collar 27. An operating lever 161 (Fig. 1) carried on the shaft portion 153 of the crank arm 155 controls the movements of the shift collar 27.

A shift fork 162, similar to the shift fork 160, cooperates with the shiftable gear 35 and derives its movements from an operating lever 163 similar to the lever 161 and carried on the end of the shaft portion 154 of the crank arm 156. The operating levers 161 and 163 are connected by a linkage mechanism subsequently to be described to the steering post control mechanism which includes the gear shift lever 150.

An interlock device 164 permits the operating levers 161 and 163 to be shifted only one at a time. This device 164 includes a sector portion 165 on each of the crank arms 155 and 156, each sector having notches 166 formed therein for cooperation with a combined interlock and yieldable positioning poppet device 167 including a tube 168 mounted in a bore 169 formed in a boss 170 on the inside of the transmission casing 11. A pair of balls 171 are mounted within the end regions of the tube and are engageable in the notches 166. The balls are yieldingly urged outwardly by means of a coil spring 172. Disposed between the ends of the coil spring 172 and the balls 171 are a pair of abutments 173 having stems 174 extending inwardly toward each other within the confines of the spring 172. The stems 174 are of such length as to permit one of the balls 171 to ride upon a high region of its coacting sector so as to permit the corresponding crank to be oscillated for shifting one of the torque transmitting shafts. When engaged in a central notch, the ball will hold its corresponding crank in a neutral position, but when engaged in either of the side notches, the ball will yieldingly hold the crank in a position to establish a drive at a selected gear ratio through the transmission. When one of the cranks is being shifted, the corresponding ball will be moved inwardly as the high region of the sector rides against it and the stems 174 are of such length that they will then engage each other so as to form, together with the balls, an unyieldable column between the two sectors with the opposite ball centered in one of its coacting notches so as to prevent shifting of the other crank. Thus it is impossible to simultaneously shift both cranks. The notches 166 in the sector portions 165 are of such a nature that neither one of the torque transmitting shafts 153 or 154 can be moved from one position to another unless the other shaft is in its neutral position. For a more detailed disclosure of such an interlock device, reference may be had to the patent to Haigh, No. 2,350,506, dated June 6, 1944, for a transmission.

The invention contemplates the employment of a conventional type of control mechanism of such a character that when one of the shift levers 161 or 163 is out of its neutral position and consequently a certain gear ratio has been selected, it will be impossible for the linkage mechanism leading from the gear shift lever 150 to select the other operating lever for operation.

The operating lever 161 is provided with a notch 175 therein designed for cooperation with the operating finger 176 of a microswitch hereinafter referred to as the neutral switch $Sn$ and which constitutes one of the electrical instrumentalities associated with the control system of the present invention. The neutral switch $Sn$ is suitably secured to the transmission casing and for convenience, it is bolted to the bearing boss 151 through which the operating shaft 153 extends. When the transmission is in neutral, the lever 161 will assume a position wherein the operating finger 176 enters the notch 175 and a certain electrical circuit is conditioned or potentially established by the closing of certain contacts. Upon completion of the circuit by depression of the accelerator pedal, the primary coil of the ignition system of the vehicle becomes grounded in a manner that will be described presently so that the engine is prevented from racing during that portion of a shift cycle when the clutch is disengaged. The neutral switch $Sn$ also serves to prevent initiation of a gear shift cycle when the transmission is operating in low or reverse gear ratio.

The above-mentioned linkage which extends between the steering post control mechanism and the operating levers 161 and 163 is schematically shown in Fig. 1 and includes a rod 180 pivotally connected at one end to the lever 163 and a similar rod 181 pivotally connected at one end to the lever 161. The other ends of the rods 180 and 181 are secured to respective slide members 182 and 183 which are disposed at different elevations below the steering post 184 of the vehicle and which are supported in guideways (not shown) for longitudinal fore and aft shifting movements. The shift lever 150 has its inner end secured to a central shift rod 185 which projects downwardly through the steering post 184 and which has secured thereto at its lower end an operating finger 186, designed for selective reception in a pair of notches 187 and 188 formed in the slide members 182 and 183, respectively. A coil spring 189 serves to maintain the shift rod 185 in its lowermost position with the finger 186 disposed within the notch 188 so that a clockwise movement of the shift lever 150 will move the slide member 183 rearwardly to rock the operating lever 161 in a counter-clockwise direction and shift the collar 27 to the left to establish a direct drive and so that a counter-clockwise movement of the shift lever 150 will cause the slide member 183 to be moved forwardly to impart a clockwise movement to the operating lever 161 and cause the shift collar 27 to be moved to the right to establish second or intermediate speed gear ratio.

In order to shift the transmission into reverse or low gear ratio, the operator may elevate the shift lever 150 in the usual manner so that the finger 186 will project into the notch 187 and control the movements of the slide member 182 to effect shifting of the gear 35 to establish a reverse or low speed gear ratio as desired in the manner previously indicated. The positions which the shift lever 150 must assume to obtain the various gear ratios of which the transmission is capable are indicated by legending in Fig. 1.

Where automatic gear shifting operations are resorted to, the present invention is concerned only with shifting movement of the slide member 183 between its two extreme positions wherein the transmission may be shifted between second speed gear ratio and high or direct gear ratio. Such automatic gear shifting operations are attained by virtue of the provision of a depending shift finger 190 (Figs. 3 and 4) which is mounted on the shaft 159 within the transmission casing 11 and which projects downwardly within the casing alongside the clutch throw-out and re-entry cam 109. The gear shift finger 190 is provided with a hub portion 191 through which the shaft 159 extends. A lost motion connection between the hub 191 and shaft 159 is provided by virtue of a pair of ears 192 which project into elongated slots 193 formed interiorly of the hub 191. A lost motion take-up spring 194 is secured to a stationary lug 195 formed on the transmission casing and has its end projecting between a pair of ears 196 formed on the hub 191. The purpose of the lost motion connection will become apparent presently.

A roller 197 is mounted on the cam 109 and the shift finger 190 is normally positioned directly in the path of movement of the roller so that as the cam 109 makes a complete counter-clockwise revolution, the roller 197 will engage one side of the depending shift finger 190 and cause the latter to be swung in a clockwise direction to rotate the shaft 159 correspondingly and effect an up-shift from second speed gear ratio into third speed gear ratio. Similarly, upon rotation of the roller 197 in the opposite direction, it will engage the other side of the shift finger 190 to cause the latter, together with the shaft 159, to be swung in a counter-clockwise direction to effect a down-shift from third speed gear ratio into second speed gear ratio. The lost motion connection between the hub 191 and shaft 159 is provided for the purpose of insuring that the gear shift finger 190 will at all times be positioned in the path of movement of the roller 197 at the commencement of a gear shift cycle whether the cycle be for an up-shift as represented by a counter-clockwise revolution of the cam shaft 110 as viewed in Fig. 4, or for a down-shift as represented by a clockwise revolution of the cam shaft 110. During the actual gear shift portion of the cycle when the roller 197 is in engagement with the side of the gear shift finger 190, the lost motion existing between the finger 190 and the shaft 159 is taken up. However, as soon as the finger 190 is released by the roller 197, the spring 194 causes the finger 190 to move in a reverse direction throughout a few degrees of angularity as permitted by the lost motion connection so that the end region of the finger 190 will be positioned squarely in the path of the roller 197 during the next succeeding shift cycle when the roller travels in an opposite direction.

In Fig. 4 the clutch throw-out cam 109 is shown in its normal between-cycle position of rest. The gear shift finger 190 is shown in full lines in the position it assumes when the transmission is in second speed gear ratio and the dotted line position of the finger indicates the position it assumes when the transmission is in third speed gear ratio. It is to be noted that the axial center line of the roller 197 lies in a plane which bisects the angle formed by the two extreme positions of the gear shift finger 190 so that upon rotation of the clutch throw-out cam 109 in either direction, the arcuate distance traveled by the roller from its position of rest to its position of initial contact with the gear shift finger 190 will be the same. In other words, whether an up-shift or a down-shift cycle takes place, the actual point in the cycle at which gear shifting operations commence will remain the same and in either case, with respect to the clutch throw-out and re-entry operations, the same timing sequence will prevail. As illustrated in the timing chart of Fig. 8, clutch throw-out operations commence shortly after the cycle is initiated and are completed at approximately 120° in the cycle. At this point, gear shift operations commence and these are completed at approximately 240° in the cycle whether the change in gear ratio be for an up-shift or for a down-shift. Immediately after the gear shift operation has been completed, clutch re-entry commences and this is completed at substantially 360° in the cycle.

Referring now to Fig. 3, the cover plate 123 of the gear reduction unit 120 has mounted thereon an inwardly projecting tubular member 198 on which there is rotatably mounted a motor reversing cam 199 which is designed for limited turning movement in opposite directions on the tubular member 198. The cam member 199 is frictionally held on the member 198 against free turning movement thereon and, toward this end, a corrugated washer 200 surrounds the member 198, and bears against the inner face of the cover plate 123. A second friction washer 201 surrounds the member 198 and bears against the corrugated washer 200 on one side thereof and against the reversing cam 199 on the other side thereof. The tubular member 198 is provided with an annular radial flange 202 against which the side of the reversing cam 199 bears so that this cam is frictionally held between the flange 202 and the side of the friction washer 201, the latter being keyed as at 203 to the tubular member 198.

A finger 204 is formed on and projects latterly from the periphery of the reversing cam 199 and is positioned in the path of movement of a similar finger 205 formed on a disc 206 which is keyed to and rotatable with the cam shaft 110.

As shown in Fig. 6, the reversing cam 199 is provided with an elevation 207 designed for co-operation with the operating finger 208 of a microswitch Sr which constitutes a reversing switch for reversing the polarity of the field windings of the motor M to effect reversal of movement of the cam shaft 110 as will be described when the electrical features of the invention are discussed. The finger 205 is angularly disposed on the cam shaft 110 in such a manner that at the end of each shift cycle representing an up-shift from second speed gear ratio to third speed gear ratio, the finger 208 will ride outwardly upon the elevated portion 207 and remain there until the next succeeding down-shift cycle takes place. Similarly at the end of each down-shift cycle the finger 208 is adapted to ride inwardly of the cam 199 onto the lower regions thereof. As shown in Fig. 7, the reversing switch Sr is of the double throw double contact type and is possessed of a pair of #1 contacts and a pair of #2 contacts adapted to be alternately closed by a pivoted arm 209 to effect a reversal of polarity through the field windings of the motor at the end of each shift cycle of operation of the mechanism.

Referring now to Figs. 3 and 5, an interrupter cam 210 is keyed to the cam shaft 110 and is thus rotatable therewith in opposite directions. This cam 210 is provided with a high portion 211 and low portion 212 which cooperate with the operating finger 213 of a microswitch assembly Si similar in its construction to the switch Sr and likewise having #1 and #2 contacts. The switch Si constitutes an interrupter switch, the function of which will become apparent when the circuit diagram of Fig. 7 is discussed.

Referring now to the circuit diagram of Fig. 7, a number of electrical and other instrumentalities have been shown in their proper electrical relationship and cooperate with one another in carrying out the principles of the invention so that voluntary or involuntary gear shift operations will take place in accordance with the principles of the invention.

The operator of a vehicle equipped with the control mechanism of the present invention is confronted with very little that is unfamiliar to the average driver. Although the need for them is largely eliminated, the standard gear shift lever 150 and the usual clutch pedal may be retained in the vehicle and may be used in the conventional manner to accomplish their normal functions when desired.

A selector switch Ss is provided and this switch may be located at any suitable point within the vehicle where it is accessible for manual manipulation by the driver as, for example, on the steering column or on the instrument panel 73 of the vehicle. The previously described neutral switch Sn which is secured to the boss 151 (see Fig. 1) surrounding the torque transmitting shaft 153 operates when the transmission is in neutral, low or reverse drive to demobilize the entire electrical control system of the present invention.

A governor switch Sg operates under the control of a governor 214 associated with the output or driven shaft 17 of the transmission. Under a pre-determined vehicle speed of approximately 10 miles per hour, the #2 contacts of this switch are adapted to remain closed while over this vehicle speed, these #2 contacts become open and the #1 contacts thereof become closed. The #3 contacts of the governor switch Sg remain closed under a vehicle speed of approximately 25 miles per hour and are adapted to become opened when this vehicle speed is exceeded. The governor switch Sg is also provided with a pair of #4 contacts which, when an overdrive mechanism is employed in connection with the transmission 10, form a part of the standard overdrive electrical circuit.

Referring now to Figs. 1 and 7, an accelerator switch Sa is provided and includes normally closed #1 contacts and normally open #2 and #3 contacts. This switch may be located on the vehicle floorboard 67 and is adapted to be operated under the control of the usual accelerator pedal 215. It will be seen from an inspection of Fig. 7 that upon depression of the accelerator pedal 215, the normally closed #1 contacts of the switch Sa are adapted to become opened and the normally open #2 and #3 contacts are adapted to become closed. In Fig. 7 the accelerator is shown as being depressed against the influence of a spring 216 with the #1 contacts thereof open and the #2 and #3 contacts thereof closed.

Referring now to Fig. 1, the vehicle engine 15 is provided with the usual carburetor designated in its entirety at 220 and having a pivoted butterfly valve 221 associated therewith, this valve being shown in its fully closed position with the accelerator pedal 215 being released. The valve 221 is adapted to be operated under the control of a link 222 having a lost motion connection 223 with the butterfly valve 221 and a ball and socket joint 224 with the accelerator pedal 215. A throttle dashpot assembly designated in its entirety at 225 operates to retard closure of the butterfly valve 221 to prevent the engine from decelerating too rapidly during the interval of time existing when the clutch 16 is disengaged during a transmission up-shift or a transmission down-shift so that the engine will not act initially as a brake on the vehicle and cause an objectionable negative lurch at the commencement of a shift cycle. The dashpot 225 is of the single acting type and may have a mechanical arrangement similar to that described in connection with the clutch re-entry dashpot assembly 92.

A brake switch Sb (Fig. 7) is provided and is of the normally closed type, but it is adapted to become open when the brake pedal 226 of the vehicle is depressed.

A reversing switch Sr having #1 and #2 contacts is adapted to become reversed near the end of each shift cycle to condition the control system for a down-shift when an up-shift has just been completed and vice versa.

An interrupter switch Si having its #1 contacts normally closed and its #2 contacts normally open is adapted to become reversed at predetermined points in the gear shift cycle as will be explained presently. A circuit breaker CB is also provided and may be located on the dashboard of the vehicle or in any suitable convenient location.

A plurality of relay magnets and their associated relay contacts are provided and may be enclosed within a casing (not shown) mounted at a convenient location on the vehicle as, for example, on the side of the vehicle transmission casing 11. These magnets include an up-shift magnet Ru having #1 and #2 contacts, a down-shift magnet Rd likewise having #1 and #2 contacts and an interrupter magnet Ri having a single pair of contacts 250.

Current is supplied to the control system from the usual automobile battery B of Fig. 7 through the circuit breaker CB. If the transmission is assumed to be in second speed gear ratio and the car to have been accelerated above the speed for which the #1 and #2 contacts of the governor switch Sg are set, release of the accelerator pedal 216 will close the #1 contacts of the switch Sa, thus calling for an up-shift of the transmission from second speed gear ratio to third speed gear ratio. Current will flow from the positive side of the battery through a lead 252, selector switch Ss (now closed), lead 253, #2 contacts of the neutral switch Sn, leads 254, 255, #1 contacts of the governor switch Sg (now closed), lead 256, #1 contacts of the accelerator switch Sa (closed by virtue of release of the accelerator pedal 215), lead 257, normally closed brake switch Sb, leads 258, 259, #1 contacts of the reversing switch Sr (now closed), lead 260, up-shift relay magnet Ru, and lead 261 to the negative side of the battery.

Completion of the circuit just described causes energization of the up-shift magnet Ru and closure of the #2 contacts thereof whereby a circuit is completed through the field winding 267 of the motor M. This circuit exists from the positive side of the battery B through lead 252, selector switch Ss, leads 262, 263, #2 contacts of the up-shift magnet R*u* (now closed), leads 264, 265, 266, field winding 267 of the motor M, lead 268, #1 contacts of the down-shift relay magnet R*d*, lead 269 to the negative side of the battery. A one-way blocking device or rectifier 270 prevents short-circuiting of the field winding 267 of the motor M. Current may pass through the one-way blocking device or rectifier 271 to energize the interrupter magnet R*i*. The circuit for this latter magnet exists from the battery B through lead 252, selector switch S*s*, leads 262, 263, #2 contacts of the up-shift magnet R*u* (now closed), leads 264, 272, rectifier 271, lead 273, interrupter magnet R*i*, lead 274, #1 contacts (closed at this point in the cycle) of the interrupter switch S*i*, and lead 275 to the negative side of the battery. Energization of the interrupter magnet R*i* causes closure of its contacts 250, thus establishing a direct circuit for the relatively heavy armature current of the motor M. This circuit leads from the battery B, through lead 276, contacts 250, lead 277, armature 278 of the motor M and lead 279 to the negative side of the battery. Since both the field winding 267 and armature 278 of the motor M become energized as described above upon completion of their respective circuits, the motor armature commences to rotate in such a direction as to cause the cam shaft 110 to rotate in a counter-clockwise direction as viewed in Fig. 4 to initiate an up-shift cycle.

At the commencement of the up-shift cycle, the clutch throw-out cam 109 commences to rotate in a counter-clockwise direction as viewed in Fig. 4 and as may be determined from the timing chart of Fig. 8, urging the follower 106 in a clockwise direction as viewed in Fig. 4, thereby disengaging the clutch 16 in the manner previously described. After the cam has rotated approximately 120° the clutch becomes fully disengaged but the actual gear shifting operations have not yet commenced to take place. At this position of the cam shaft 110 the interrupter cam 210 has moved to a position wherein the #2 contacts of the interrupter switch S*i* become closed and the #1 contacts thereof become opened. It may be assumed at this point that the operator has again depressed the accelerator pedal 215 to accelerate the vehicle and, as a consequence, the #1 contacts of the accelerator switch S*a* have become open. Such opening of the #1 contacts of this switch serves to open the previously described circuit through the up-shift magnet R*u* but this magnet remains energized under the influence of a holding circuit which was established upon initial energization thereof. This holding circuit exists from the field winding 267 of the motor M through leads 266, 280, rectifier 281, leads 282, 259, #1 contacts of the reversing switch S*r* (now closed), lead 260, magnet R*u* and lead 261 to the negative side of the battery.

The up-shift magnet R*u* thus remains energized and is unaffected by reversal of movements of the neutral switch S*n*, the governor switch S*g*, the accelerator switch S*a*, or the brake pedal switch S*b*.

As previously stated, due to movement of the cam shaft 110 in a counter-clockwise direction as viewed in Fig. 4 and consequent rotation of the interrupter cam 210, the #2 contacts of the interrupter switch S*i* become closed and the #1 contacts thereof become opened. Closure of the #2 contacts of the interrupter switch S*i* serves momentarily to place the winding of the interrupter magnet R*i* in series with the armature of the motor M, this circuit leading from the battery B through lead 252, selector switch S*s*, leads 262, 263, #2 contacts of the upshift magnet R*u*, leads 264, 272, rectifier 271, lead 273, magnet R*i*, lead 274, #2 contacts of the interrupter switch S*i*, resistance R, armature 278 of the motor M, and lead 279 to the negative side of the battery. With the #2 contacts of the switch S*i* thus closed, the interrupter magnet R*i* and its contacts 250 operate in the manner of a vibrator to intermittently interrupt the direct flow of heavy armature current through the motor M to cause the motor to operate at reduced speed and slow down the gear shifting operations and effect a smoother shift. With the #2 contacts of the switch S*i* closed and with the contacts 250 also closed, a circuit exists which shunts the interrupter magnet R*i*, thus causing the latter to become de-energized to permit the contacts 250 to become opened.

The resistance R together with the resistance of the winding of the magnet R*i* greatly restricts the flow of current through the armature of the motor and leaves insufficient current to operate the motor. However, since the circuit through the field winding 267 of the motor still exists, the motor commences to operate in the manner of a generator to induce a voltage counter to or opposite in polarity to the line voltage in the magnet circuit. The voltage applied in this circuit is therefore the difference between the line voltage and the opposing motor generated voltage. At high motor speeds the difference is small, and is insufficient to energize the magnet R*i*. However, as the motor speed falls off by virtue of the motor coasting with a decelerating motion, the voltage differential applied to the magnet R*i* increases until, at a definite motor speed, it is sufficient to again energize the magnet R*i* through the circuit previously described. As soon as this happens, the contacts 250 again become closed and full line voltage is again applied to the motor armature to bring the motor back to full power operation. Reclosure of the contacts 250 again places a shunt around the winding of the magnet R*i* and the entire process is repeated with the net result that the motor operates intermittently and consequently at reduced speed during actual gear shift operations. It will be seen that by varying the value of the resistance R, the speed to which the motor must fall before sufficient voltage differential exists across the magnet coil to close the contacts 250 may be varied.

Referring now to Fig. 9, one form which the interrupter relay magnet R*i* and its contacts 250 may assume has been illustrated although it will be understood that other forms of a satisfactory relay construction may be resorted to while still maintaining an operative structure. The magnet casing 290 is generally of cup-shape design and is provided with a cover plate 291. The magnet coil 292 is disposed within the casing 290 adjacent the bottom thereof and has slidably mounted therein a plunger or core 293. Energization of the coil 292 causes the plunger 293 to be drawn downwardly within the body of the coil 292 against the action of a coil spring 294. The plunger 293 carries an insulating disc 295 having mounted thereon a contact plate 296 which is adapted, upon energization of the magnet and consequent retracting of the plunger 293 into the coil 292, to engage and electrically connect a pair of contact elements 297 carried at opposite sides of the magnet casing 290. The contact elements 297 together with the contact plate 296 constitute the electrical contacts 250 shown in the circuit diagram of Fig. 7. The plunger 293 is provided with a reduced extension 298 carrying a washer 299 at its outer end and a second spring 300 at one end thereof bears against the washer 299 and the other end thereof bears against the insulating disc 295, thus normally causing the plunger 293 to bear against the disc 295. The rate of the spring 300 is greater than the rate of the spring 294 or, in other words, the former spring presents a greater resistance to compression than the latter one so that upon energization of the coil 292 and consequent downward movement of the plunger 293, the spring 294 will first become compressed until such time as the contact plate 296 makes initial contact with the contact elements 297, after which further downward movement of the plunger 293 will cause compression of the spring 300. Upon deenergization of the coil 292, the plunger 293 is first urged upwardly by the spring 300 until such time as the plunger engages the disc 295 after which time the spring 294 urges the entire plunger assembly upwardly to open the contacts 250.

From the above description of parts, it will be seen that the relay magnet R$i$ has been designed to accommodate a steady flow of heavy armature current through the motor circuit during those portions of the gear shift cycle wherein clutch throw-out and re-entry operations take place and which occur, roughly speaking, during the first and last third of the machine cycle as shown in the timing chart of Fig. 8. During these portions of the cycle, contacts 250 are adapted to remain continuously closed and in order to insure passage of the full armature current through these contacts without arcing, the spring 300 being fully compressed exerts a powerful influence on the contact plate 296 and forces the same against the contact elements 297 with considerable pressure. During the intermittent action of the relay magnet which occurs, roughly speaking, during a second third of the machine cycle, such a positive sealing action of the contacts 250 is not required and the full force of the spring 300 is not impressed on the contact plate 296, although plunger inertia and gravity have some effect on the pressure which is applied to the plate 296 by the spring 300. In the operation of the relay magnet R$i$, the initial magnetic pull on the plunger 293 causes the air gap indicated at 301 to be reduced so that the magnetic pull increases rapidly causing the plunger 293 initially to move downwardly against the action of the spring 294 and finally to move downwardly still further against the action of the spring 300 to effect the sealing action of the contacts 250 as outlined above.

After the gear shifting operation has been completed and the shift finger 190 has been moved by the roller 197 to its limiting position and has been released by the roller 197 to permit the spring 194 to take up the lost motion connection between the finger 190 and the shaft 159, which condition of parts takes place near the end of the second third of the machine cycle, the motor continues to operate but the interrupter cam 210 reverses the interrupter switch S$i$ so that the #1 contacts thereof become closed and the #2 contacts thereof become opened, thus removing the resistor R from the magnet circuit and connecting the magnet directly across the battery terminals through the circuit previously described. The contacts 250 thus remain closed continuously and a steady flow of current through the motor armature obtains so that the motor rapidly resumes its full speed operation.

At this time clutch re-entry operations commence and the cam 109 continues to rotate and the follower 106 moves inwardly toward the axis of the cam under the control of the dashpot assembly 92.

During a complete clockwise revolution of the cam 109 and the cam shaft 110 as seen in Fig. 6, the finger 205 leaves the cooperating finger 204 of the reversing switch cam 199 and, toward the end of a complete revolution of the cam 199, it engages the other side of the finger 204 and drives the cam 199 clockwise against the frictional resistance of the friction instrumentalities 200, 201. The switch-operating finger or actuator 208 thus moves outwardly on the cam 199 and operates the reversing switch so that the #1 contacts thereof open, and the #2 contacts thereof close. This opening of the #1 contacts opens the previously described holding circuit through the up-shift relay magnet R$u$. De-energization of the magnet R$u$ serves to open the #2 contacts and close the #1 contacts thereof, thus opening the circuit through the field winding of the motor M and also opening the circuit passing through interrupter magnet R$i$. Upon deenergization of this latter magnet, the contacts 250 thereof open to interrupt the flow of current through the motor armature 278. With the flow of current through the field winding 267 and armature of the motor M discontinued, the action of the motor is rapidly brought to a standstill by the action of the friction instrumentalities which cooperate with the reversing switch cam 199 as previously outlined.

The only flow of current then existing in the electrical controls illustrated in Fig. 7 is the flow of current through the ignition system, the circuit extending from the battery B through lead 302, the primary winding 303 of the ignition coil, leads 304, 305, distributor contacts 306 and lead 307 to the negative side of the battery.

The down-shift cycle from third speed gear ratio to second speed gear ratio is similar to that just described with the exception that the cam shaft 110 rotates in a clockwise direction as seen in Fig. 4 causing the roller 197 to move the shift finger 190 to the right. As soon as the governor 214 falls below the speed for which it has been set, which may be approximately 10 miles per hour, the #1 contacts of the governor switch S$g$ become open and the #2 contacts thereof become closed, thus establishing a circuit from the battery B through lead 252, selector switch S$s$, lead 253, #2 contacts of the neutral switch (now closed), leads 254, 255, #2 contacts of the governor switch S$g$, leads 308, 309, #2 contacts of the reversing switch S$r$ (now closed), lead 310, down-shift magnet R$d$, lead 311, #3 contacts of the governor switch S$g$ and lead 312 to the negative side of the battery. Energization of the down-shift magnet R$d$ serves to open the #1 contacts thereof and close the #2 contacts thereof, thus establishing a circuit through the field winding 267 of the motor M leading from the battery B through lead 252, selector switch S$s$, lead 262, #2 contacts of the down-shift relay magnet R$d$, lead 268, field winding 267 of the motor M, leads 266, 265, 264, and #1 contacts of the up-shift magnet R$u$ (now closed) to the negative side of the battery. Upon energization of the down-shift magnet R$d$, a holding circuit is established for this magnet extending from the field winding of the motor M, lead 313, one-way device or rectifier 314, leads 315, 309, #2 contacts of the reversing switch Sr (now closed), lead 310, magnet Rd, lead 311, #3 contacts of the governor switch Sg, and lead 312 to the negative side of the battery.

The automatic down-shift just described will take place whenever the vehicle speed falls below the predetermined setting of the #2 contacts of the governor switch Sg regardless of the position of the accelerator pedal 215. This is an automatic shift which is independent of any voluntary action on the part of the driver. If at the time of such a down-shift the accelerator pedal is depressed and the throttle is fairly wide open, the engine will tend to race during that portion of the shift cycle when the clutch becomes disengaged. Additionally, upon re-engagement of the clutch, a positive lurch of the vehicle forwardly due to the inertia of the engine is apt to result. Both of these objectionable phenomena are corrected by the present invention by means which will now be described.

It will be seen that the #1 contacts of the neutral switch Sn become closed whenever the transmission is in its neutral condition by virtue of the finger 176 entering the notch 175 formed in the operating lever 161. One of the #1 contacts of the neutral switch Sn is connected directly to the negative side of the battery through a lead 316 while the other #1 contact is connected through the #3 contacts of the accelerator switch Sa to the primary ignition coil 303 of the vehicle ignition system. Thus, if the accelerator pedal 215 is depressed to substantially its open throttle kickdown position so as to close the #3 contacts, at the time the transmission assumes its neutral condition during downshift from third speed gear ratio to second speed gear ratio, the primary ignition coil 303 will be grounded through a circuit leading from this coil through leads 304, 317, #3 contacts of the switch Sa, leads 318, 319, #1 contacts of the switch Sn, and lead 316 to the negative side of the battery. No backward lurch of the vehicle is encountered due to ignition interruption because the clutch is disengaged at the time the ignition becomes grounded. No ignition interruption will occur during an up-shift from second speed gear ratio to third speed gear ratio inasmuch as the accelerator pedal 215 must be released in order to initiate the shift. The #3 contacts of the switch Sa therefore, being open, no circuit from the primary ignition coil 303 to the negative side of the battery is in effect. If the driver signals for an up-shift by releasing the accelerator pedal 215 and then immediately depresses the pedal and closes the #3 contacts of the switch Sa, ignition interruption will take place, thus preventing the engine from racing during the actual gear shifting portion of the cycle.

In order to obtain a voluntary shift or kickdown from third speed gear ratio to second speed gear ratio when the accelerator pedal 215 is fully depressed, the #2 contacts to the accelerator switch Sa are provided. These contacts are adapted to become closed whenever the accelerator is depressed to or beyond wide open throttle position, and their function is to place a shunt around the #2 contacts of the governor switch Sg. After the vehicle has become accelerated above the speed for which the governor 214 is set, the #1 contacts of the switch Sg are closed and the #2 contacts thereof become open. Thus, with the #2 contacts of the switch Sa closed by virtue of depression of the accelerator pedal 215, a circuit exists from the battery B through lead 252, selector switch Ss, lead 253, contacts of the neutral switch Sn, lead 254, #2 contacts of the switch Sa, leads 320, 308, 309, #2 contacts of the reversing switch Sr (now closed), lead 316, downshift magnet Rd, lead 311, #3 contacts of the governor switch Sg and lead 312 to the negative side of the battery. After such a voluntary shift or kickdown from third speed gear ratio to second speed gear ratio has taken place, an automatic upshift to third speed gear ratio will take place when the accelerator pedal 215 is released to close the #1 contacts of the accelerator switch Sa through the normal upshift circuit passing through the magnet Ru as previously described.

While employing the engine for braking purposes in second speed gear ratio as, for example, when descending a steep grade, it is desirable to prevent an automatic upshift when the speed of the governor 214 is exceeded. Otherwise, a sudden loss of engine braking will be experienced at an unexpected moment. To prevent this, the brake switch Sb is provided and is inserted in series with the accelerator switch Sa in the upshift circuit. The contacts of the switch Sb are adapted to become open whenever the brake pedal 226 is applied to open the normal circuit through the upshift magnet Ru. When the descent has been accomplished and braking is no longer required, an upshift to third speed gear ratio may be attained merely by releasing the brake pedal.

A voluntary downshift or kickdown from third speed gear ratio to second speed gear ratio is not effective in providing increased acceleration at vehicle speeds exceeding approximately 25 miles per hour. For this reason, it is desirable to prevent such a kickdown when the vehicle is traveling at these relatively higher speeds. Whereas the #1 and #2 contacts of the governor switch Sg are set so that they may be shifted at vehicle speeds of approximately 10 miles per hour, the #3 contacts of this switch are set to become opened whenever the vehicle exceeds approximately 25 miles per hour. These #3 contacts of the governor switch Sg are placed in the downshift circuit passing through the downshift magnet Rd and, while they may be placed at any suitable location in this circuit, they are preferably placed in the line leading from the downshift magnet directly to the negative side of the battery. Obviously, when these contacts are opened at vehicle speeds above 25 miles per hour, it is impossible to complete the downshift circuit through the downshift magnet Rd.

Where an overdrive is employed in connection with the transmission of the present invention, the pair of #4 contacts are associated with the governor 214 and form a part of the standard overdrive control circuit so that kickdown from overdrive to third speed gear ratio will be effected upon depression of the accelerator pedal 215 at high vehicle speeds as, for example, at 45 miles per hour without affecting any of the electric controls of the present invention.

It has been stated above that whenever an automatic shift is made, either involuntarily by virtue of driving conditions or as a voluntary act on the part of the driver as, for example, when he resorts to a throttle kickdown from third speed gear ratio to second speed gear ratio, the manual gear shift lever 150 moves correspondingly, that is, if the transmission shifts automatically from second speed gear ratio to third speed gear ratio, the gear shift lever 150 moves from second speed to third speed position. This phenomenon is desirable inasmuch as the driver will always be made aware of the particular gear ratio at which the transmission operates and should he desire to make a manual shift, he need only manually disengage the clutch 16 and move the gear shift lever 150 to a selected position providing, of course, a shift cycle is not in progress.

The motor reduction gearing 125, 126, etc., is made reversible, i. e., it is capable of being turned either by torque applied by the motor or by torque applied to the cam shaft 110. This is desirable so that in the event of electrical control failure, the driver will not find the vehicle in a condition where the clutch is permanently disengaged with no ready means for re-engaging it. Reversible gearing, designed according to suitable engineering exigencies, and proper designing of the contour of the cam 109 eliminates the possibility of such permanent clutch disengagement.

An example of such gear train reversibility may be had by reference to Fig. 3. If it is supposed that failure of the electrical system occurs when the follower roller 108 is on the high circular arcuate portion of the cam somewhere within the confines of the sector *de* when the upshift is in progress thus holding the clutch 16 disengaged, the clutch cannot be re-engaged because insufficient torque can be applied to the cam by the roller 108. If now the driver urges the manual gear shift lever 150 toward second gear position, the shift finger 190 will exert a force on the roller 197 tending to move the cam 109 in a clockwise direction as viewed in Fig. 4. Since the gear reduction train is reversible, the cam 109, all the gears of the reduction train, and the motor will rotate to a position wherein the roller 197 separates from the finger 190. In this position the roller 108 is no longer on the high circular arcuate portion of the cam 109, but is on the downward slope. Thus, the pressure springs 48 of the clutch mechanism 16 (Fig. 1) may now react back through the cam follower 106 to apply continued clockwise torque to the cam 109. The clutch 16 thus becomes reengaged and the vehicle is left in a condition where the car may be driven manually in the customary manner of vehicle operation.

In order to avoid a "dead spot" through which torque cannot be applied to the cam 109 either manually or through the shift finger 190, or by the pressure of the clutch springs 48 through the cam follower 106, the cam 109 has been designed with a contour which requires the follower roller 108 to move on to the sloped portion of the cam at a point in the gear shift cycle in advance of the time that the roller 197 is out of the influence of the shift finger 190. As shown in the timing chart of Fig. 8, there is a slight rise of the throw-out cam 109 from that portion of the cycle existing between 120° and 180° and there is a slight decline of this cam from that portion of the cycle existing between 180° and 240°.

While I have described my invention in connection with one specific embodiment thereof, it is to be understood that this is by way of illustration and not by way of limitation and the scope of my invention is defined solely by the appended claims which should be construed as broadly as the prior art will permit.

I claim:

1. In a system including an internal combustion engine, a transmission mechanism connected to said engine and including a driving shaft and a driven shaft, means interposed between said shafts and operative to couple the former to the latter at various speed ratios and including a gear shift element movable in one direction to effect a transmission up-shift and movable in the opposite direction to effect a transmission downshift, a normally closed throttle valve for controlling the power supplied by said engine, electrical means controlling the displacement of said gear shift element, said electrical means being operable when the speed of said driven shaft falls below a predetermined speed to move said gear shift element in one direction and effect a transmission down-shift, said electrical means being operable when the speed of said driven shaft exceeds said predetermined speed and said throttle valve is substantially closed to move the gear shift element in the opposite direction and effect a transmission up-shift, and speed controlled switch means responsive to the speed of the driven shaft when the speed of said driven shaft exceeds a predetermined speed higher than said first-mentioned predetermined speed for rendering said electrical means inoperative to move said gear shift element to prevent a transmission down-shift.

2. In combination, a transmission including a driving shaft and a driven shaft, means interposed between said shafts and operable to couple the former to the latter at various speed ratios and including a gear shift element movable in one direction from one extreme position to another extreme position and through a neutral position to effect a transmission up-shift and movable in the opposite direction from said latter extreme position through said neutral position to said first extreme position to effect a transmission down-shift, cyclicly operable electrical means controlling the displacement of said gear shift element, said electrical means being operable when the driven shaft exceeds a predetermined speed to initiate a shift cycle and move said gear shift element in a direction to effect a transmission up-shift and being operable when said driven shaft falls below a predetermined speed to initiate a shift cycle and move the gear shift element in the opposite direction to effect a transmission down-shift, control means adapted when moved to a certain position to render said electric means inoperative to initiate a shift cycle, and a member movable with said shift element, said member acting to move said control means to said certain position when said shift element is moved to neutral position and out of said certain position when said shift element is in either of said extreme positions.

3. In combination, a transmission including a driving shaft and a driven shaft, means interposed between said shafts and operable to couple the former to the latter at various speed ratios and including a gear shift element movable in one direction from one extreme position to another extreme position and through a neutral position to effect a transmission up-shift and movable in the opposite direction from said latter extreme position through said neutral position to said first extreme position to effect a transmission downshift, cyclicly operable electrical means controlling the displacement of said gear shift element, said electrical means being operable when the driven shaft exceeds a predetermined speed to initiate a shift cycle and move said gear shift element in a direction to effect a transmission up-shift and being operable when said driven shaft falls below a predetermined speed to initiate a shift cycle and move the gear shift element in the opposite direction to effect a transmission down-shift, means operable when said gear shift element is in its neutral position prior to initiation of a shift cycle for rendering said electrical means inoperative, and means operable after commencement of a shift cycle for rendering said last-mentioned means ineffective during movement of the gear shift element through its neutral position.

4. In a system including an internal combustion engine, a transmission mechanism connected to said engine and including a driving shaft and a driven shaft, means interposed between said shafts and operative to couple the former to the latter at various speed ratios including an intermediate speed ratio and a high speed ratio and including a gear shift element movable in one direction to effect a transmission up-shift between said specified ratios and movable in the opposite direction to effect a transmission down-shift between said specified ratios, a normally closed throttle valve for controlling the power supplied by said engine, cyclicly operable electrical means controlling the displacement of said gear shift element, said electrical means being operable when the speed of the driven shaft falls below a predetermined speed to initiate a shift cycle and move said gear shift element in one direction and effect a transmission down-shift between said specified gear ratios, said electrical means being operable when the speed of said driven shaft exceeds a predetermined speed and said throttle valve is substantially closed to initiate a shift cycle and move said gear shift element in the opposite direction and effect a transmission upshift between said specified gear ratios, and means operable when said transmission assumes a gear ratio other than said specified gear ratios for rendering said electrical means inoperative.

5. In a system including an internal combustion engine provided with an ignition circuit, a transmission mechanism connected to said engine and including a driving shaft and a driven shaft, means interposed between said shafts and operative to couple the former to the latter at various speed ratios including an intermediate speed ratio and a high speed ratio and including a gear shift element movable in one direction from an extreme position through a neutral position to another extreme position to effect a transmission up-shift between said specified ratios and similarly movable in the opposite direction through a neutral position to effect a transmission down-shift between said specified ratios, a normally closed throttle valve for controlling the power supplied by said engine, cyclicly operable electrical means controlling the displacement of said gear shift element, said electrical means being operable when the speed of said driven shaft exceeds a predetermined speed and said throttle valve is substantially closed to initiate a shift cycle and move said gear shift element in one direction and effect a transmission up-shift between said specified gear ratios, said electrical means being operable when the speed of the driven shaft falls below a predetermined speed to initiate a shift cycle and move the gear shift element in the opposite direction and effect a transmission down-shift between said specified gear ratios, means operable when said transmission assumes a gear ratio other than said specified gear ratios for rendering said electrical means inoperative, and means operable at the commencement of a down-shift cycle for rendering said ignition circuit inoperative during movement of said gear shift element through its neutral position.

6. In a system including an internal combustion engine provided with an ignition circuit, a transmission mechanism connected to said engine and including a driving shaft and a driven shaft, means interposed between said shafts and operative to couple the former to the latter at various speed ratios including a relatively low speed ratio and a relatively high speed ratio, said means including a gear shift element movable in one direction from an extreme position through a neutral position to another extreme position to effect a transmission down-shift between said specified gear ratios, a reversible electric motor controlling the displacement of said gear shift element and means operable during movement of said gear shift element through its neutral position during a transmission down-shift for rendering said ignition circuit inoperative.

7. In a system including an internal combustion engine provided with an ignition circuit, a transmission mechanism connected to said engine and including a driving shaft and a driven shaft, means interposed between said shafts and operative to couple the former to the latter at various speed ratios including an intermediate speed ratio and a high speed ratio and including a gear shift element movable in one direction from an extreme position through a neutral position to another extreme position to effect a transmission down-shift from said high speed ratio to said intermediate speed ratio, a reversible electric motor controlling the displacement of said gear shift element and means operable during movement of said gear shift element through said neutral position during a transmission down-shift for rendering said ignition circuit inoperative.

8. In a system including an internal combustion engine provided with an ignition circuit, a transmission mechanism connected to said engine and including a driving shaft and a driven shaft, means interposed between said shafts and operative to couple the former to the latter at various speed ratios including a relatively high speed ratio and a relatively low speed ratio, said means including a gear shift element movable in one direction from an extreme position through a neutral position to another extreme position to effect a transmission down-shift from said high speed ratio to said low speed ratio, cyclicly operable electrical means controlling the displacement of said gear shift element, said electrical means being operable when the speed of the driven shaft falls below a predetermined speed to initiate a shift cycle and effect a transmission down-shift from said high speed ratio to said low speed ratio, means operable when said transmission assumes a gear ratio other than said specified gear ratios for rendering said electrical means inoperative, and means operable after the commencement of a down-shift cycle for rendering said ignition circuit inoperative during movement of the gear shift element through its neutral position.

9. In a system including an internal combustion engine provided with an ignition circuit, a transmission mechanism connected to said engine and including a driving shaft and a driven shaft, means interposed between said shafts and operative to couple the former to the latter at various speed ratios including a relatively high speed ratio and a relatively low speed ratio, said means including a gear shift element movable in one direction from an extreme position through a neutral position to another extreme position to effect a transmission down-shift from said high speed ratio to said low speed ratio, a cyclicly operable electric motor controlling the displacement of said gear shift element, said electric motor being operable when the speed of the driven shaft falls below a predetermined speed to initiate a shift cycle and effect a transmission down-shift from said high speed ratio to said low speed ratio, and means operable after the commencement of a down-shift cycle for rendering said ignition circuit inoperative during movement of the gear shift element through its neutral position.

10. In combination, a transmission including a driving shaft and a driven shaft, means interposed between said shafts and operative to couple the former to the latter at various speed ratios and including a gear shift element movable in one direction to effect a transmission up-shift and movable in the opposite direction to effect a transmission down-shift, cyclicly operable mechanism controlling the displacements of said gear shift element and including a reversible electric motor having a field winding, means operatively connecting said motor and element and operable when said motor is operated in one direction to move the element and effect a transmission up-shift and operable when said motor is operated in the other direction to move said element and effect a transmission down-shift, a pair of normally open electric circuits for said field winding and adapted when closed to pass electric current through said winding in opposite directions respectively to operate the motor in opposite directions, a normally open control circuit for each of said field winding circuits adapted when closed to effect closure of the respective circuit which it controls, a reversing switch movable between two positions, means operable when said reversing switch is in one position for potentially closing one of said control circuits, means operable when said reversing switch is in the other position for potentially closing the other of said control circuits, means operable upon rotation of the motor in either direction upon completion of a transmission up-shift or down-shift for actuating said reversing switch to potentially close one of said control circuits to condition the motor for rotation in the opposite direction, and means operable when the speed of the driven shaft exceeds or falls below predetermined speeds of rotation for completing the potentially closed control circuit.

11. In combination, a transmission including a driving shaft and a driven shaft, means interposed between said shafts and operative to couple the former to the latter at various speed ratios and including a gear shaft element movable in one direction to effect a transmission up-shift and movable in the opposite direction to effect a transmission down-shift, cyclicly operable mechanism controlling the displacements of said gear shaft element and including a reversible electric motor having a field winding, means operatively connecting said motor and element and operable when said motor is operated in one direction to move the element and effect a transmission up-shift and operable when said motor is operated in the other direction to move said element and effect a transmission down-shift, a pair of normally open electric circuits for said field winding and adapted when closed to pass electric current through said winding in opposite directions respectively to operate the motor in opposite directions, electromagnetic relay means operable when energized to close one of said normally open circuits, electromagnetic relay means operable when energized to close the other of said normally open circuits, a reversing switch movable between two positions and operable when in one position to select one of said electromagnetic relay means for subsequent energization and operable when in the other position to select the other electromagnetic relay means for subsequent energization, means operable upon rotation of the motor in either direction upon completion of a transmission up-shift or down-shift for actuating said reversing switch to select one of said electromagnetic relay means and condition the motor for rotation in the opposite direction, and means operable when the speed of the driven shaft exceeds or falls below predetermined speeds of rotation for causing energization of a selected electromagnetic relay means.

12. In combination, a transmission including a driving shaft and a driven shaft, means interposed between said shafts and operative to couple the former to the latter at various speed ratios and including a gear shaft element movable in one direction to effect a transmission up-shift and movable in the opposite direction to effect a transmission down-shift, cyclicly operable mechanism controlling the displacements of said gear shift element and including a reversible electric motor having a field winding, means operatively connecting said motor and element and operable when said motor is operated in one direction to move the element and effect a transmission up-shift and operable when said motor is operated in the other direction to move said element and effect a transmission down-shift, a pair of normally open electric circuits for said field winding and adapted when closed to pass electric current through said winding in opposite directions respectively to operate the motor in opposite directions, electromagnetic relay means operable when energized to close one of said normally open circuits, electromagnetic relay means operable when energized to close the other of said normally open circuits, a reversing switch movable between two positions and operable when in one position to select one of said electromagnetic relay means for subsequent energization and operable when in the other position to select the other electromagnetic relay means for subsequent energization, cam means operable upon rotation of the motor in either direction upon completion of a transmission up-shift or down-shift for actuating said reversing switch to select one of said electromagnetic relay means and condition the motor for rotation in the opposite direction, and means operable when the speed of the driven shaft exceeds or falls below predetermined speeds of rotation for causing energization of a selected electromagnetic relay means.

13. In combination, a transmission including a driving shaft and a driven shaft, means interposed between said shafts and operative to couple the former to the latter at various speed ratios and including a gear shift element movable in one direction to effect a transmission up-shift and movable in the opposite direction to effect a transmission down-shift, cyclicly operable mechanism controlling the displacements of said gear shift element and including a reversible electric motor having a field winding, means operatively connecting said motor and element and operable when said motor is operated in one direction to move the element and effect a transmission up-shift and operable when said motor is operated in the other direction to move said element and effect a transmission down-shift, a pair of normally open electric circuits for said field winding and adapted when closed to pass electric current through said winding in opposite directions respectively to operate the motor in opposite directions, electromagnetic relay means operable when energized to close one of said normally open circuits, electromagnetic relay means operable when energized to close the other of said normally open circuits, a reversing switch movable between two positions and operable when in one position to select one of said electromagnetic relay means for subsequent energization and operable when in the other position to select the other electromagnetic relay means for subsequent energization, means operable upon rotation of the motor in either direction upon completion of a transmission up-shift or down-shift for reversing the position of said reversing switch to select one of said electromagnetic relay means and condition the motor for rotation in the opposite direction, means operable when the speed of the driven shaft exceeds a predetermined speed or falls below a higher predetermined speed of rotation for causing energization of a selected electromagnetic relay means, and means operable when the speed of the driven shaft exceeds a still higher predetermined speed of rotation for preventing energization of one of the selected electromagnetic relay means.

14. In combination, a transmission including a driving shaft and a driven shaft, means interposed between said shafts and operative to couple the former to the latter at various speed ratios and including a gear shift element movable in one direction to effect a transmission up-shift and movable in the opposite direction to effect a transmission down-shift, cyclicly operable mechanism controlling the displacements of said gear shift element and including a reversible electric motor having a field winding, means operatively connecting said motor and element and operable when said motor is operated in one direction to move the element and effect a transmission up-shift and operable when said motor is operated in the other direction to move said element and effect a transmission down-shift, a pair of normally open electric circuits for said field winding and adapted when closed to pass electric current through said winding in opposite directions respectively to operate the motor in opposite directions, electromagnetic relay means operable when energized to close one of said normally open circuits and effect a transmission up-shift, electromagnetic relay means operable when energized to close the other of said normally open circuits and effect a transmission down-shift, a reversing switch movable between two positions and operable when in one position to select one of said electromagnetic relay means for subsequent energization and operable when in the other position to select the other electromagnetic relay means for subsequent energization, cam means operable upon rotation of the motor in either direction upon completion of a transmission up-shift or down-shift for actuating said reversing switch to select one of said electromagnetic relay means and condition the motor for rotation in the opposite direction, means operable when the speed of the driven shaft exceeds a predetermined speed of rotation for causing energization of a selected electromagnetic relay means to effect a transmission up-shift, means operable when the speed of rotation of the driven shaft falls below another predetermined speed of rotation for causing energization of a selected electromagnetic means to effect a transmission down-shift, and means operable when the speed of rotation of the driven shaft exceeds a still higher predetermined speed of rotation for preventing energization of the electromagnetic relay means which, when energized, effects a transmission down-shift.

15. In combination, a transmission including a driving shaft and a driven shaft, means interposed between said shafts and operative to couple the former to the latter at various speed ratios and including a gear shift element movable in one direction to effect a transmission up-shift and movable in the opposite direction to effect a transmission downshift, cyclicly operable mechanism controlling the displacements of said gear shift element and including a reversible electric motor, means operatively connecting said motor and element and operable when said motor is operated in one direction to move the element and effect a transmission up-shift and operable when said motor is operated in the other direction to move said element and effect a transmission down-shift, a pair of normally open electric circuits for said motor and adapted when closed to pass electric current through said motor in opposite directions respectively to operate the motor in opposite directions, a normally open control circuit for each of said motor circuits, said control circuits being operable upon closing thereof to close the respective normally open circuits which they control, a reversing switch common to said control circuits and movable between two positions, said reversing switch in one position thereof serving to potentially close one of said control circuits and in the other position thereof serving to potentially close the other control circuit, means operable upon rotation of the motor in either direction upon completion of a transmission up-shift or down-shift for shifting the position of said reversing switch, and means operable when the speed of the driven shaft exceeds or falls below predetermined speeds of rotation for completing the potentially closed control circuit.

16. In combination, a drive shaft and a driven shaft, means interposed between said shafts and operable to couple the former to the latter at various speed ratios and including a gear shift element movable in one direction to effect a transmission up-shift and movable in the opposite direction to effect a transmission down-shift, cyclicly operable control mechanism for said gear shift element including a rotatable operating shaft, an electric motor, means operatively connecting said motor and operating shaft in driving relationship, a normally open electric circuit for said motor, relay means responsive to changes in speed of said driven shaft for initially closing said motor circuit to initiate a shift cycle, means operable upon initial closing of said circuit and consequent energization of the motor for causing reopening of the circuit after the operating shaft has been rotated through a predetermined degree of angularity and the shift cycle has been completed, and means connecting said operating shaft and gear shift element for effecting gear shift operations during movements of the operating shaft, successive movements of the operating shaft serving to effect alternate transmission up-shift and down-shift operations.

17. In combination, a drive shaft and a driven shaft, means interposed between said shafts and operable to couple the former to the latter at various speed ratios and including a gear shift element movable in one direction to effect a transmission up-shift and movable in the opposite direction to effect a transmission down-shift, cyclicly operable control mechanism for said gear shift element including a rotatable operating shaft, an electric motor, means operatively connecting said motor and operating shaft in driving relationship, a normally open electric circuit for said motor, relay means responsive to changes in speed of said driven shaft for initially closing said motor circuit to initiate a shift cycle, cam means operable upon initial closing of said circuit and consequent energization of the motor for causing reopening of the circuit after the operating shaft has been rotated through a predetermined degree of angularity and the shift cycle has been completed, and means connecting said operating shaft and gear shift element for effecting gear shift operations during movements of the operating shaft, successive movements of the operating shaft serving to effect alternate transmission up-shift and down-shift operations.

18. In combination, a drive shaft and a driven shaft, means interposed between said shafts and operable to couple the former to the latter at various speed ratios and including a gear shift element movable in one direction to effect a transmission down-shift, cyclicly operable control mechanism for said gear shift element including a rotatable operating shaft, an electric motor, means operatively connecting said motor and operating shaft in driving relationship, a normally open electric circuit for said motor, a pair of normally open contacts in said motor circuit, an electromagnet operable upon energization thereof to close said normally open contacts and energize said motor circuit to initiate a shift cycle, a normally open control circuit for said electromagnet, means operable when the speed of the driven shaft exceeds a predetermined speed of rotation for closing said control circuit to energize said electromagnet, means operable upon initial closing of said motor circuit and consequent energization of the motor for causing reopening of the motor circuit after the operating shaft has been rotated through a predetermined degree of angularity and the shift cycle has been completed, and means connecting said operating shaft and gear shift element for effecting gear shift operations during movements of the operating shaft, successive movements of the operating shaft serving to effect alternate transmission up-shift and down-shift operations.

19. In combination, a drive shaft and a driven shaft, means interposed between said shafts and operable to couple the former to the latter at various speed ratios and including a gear shift element movable in one direction to effect a transmission shift, cyclicly operable control mechanism for said gear shift element including a rotatable operating shaft, an electric motor, means operatively connecting said motor and operating shaft in driving relationship, a normally open electric circuit for said motor, a pair of normally open contacts in said motor circuit, an electromagnet operable upon energization thereof to close said normally open contacts and energize said motor circuit to initiate a shift cycle, a normally open control circuit for said electromagnet, means responsive to the speed of the driven shaft for closing said control circuit to energize said electromagnet, means operable upon initial closing of said motor circuit and consequent energization of the motor for causing reopening of the motor circuit after the operating shaft has been rotated through a predetermined degree of angularity and the shift cycle has been completed, and means connecting said operating shaft and gear shift element for effecting gear shift operations during movements of the operating shaft.

20. In combination, a drive shaft and a driven shaft, means interposed between said shafts and operable to couple the former to the latter at various speed ratios and including a gear shift element movable in one direction to effect a transmission shift, cyclicly operable control mechanism for said gear shift element including a rotatable operating shaft, an electric motor, means operatively connecting said motor and operating shaft in driving relationship, a normally open electric circuit for said motor, relay means responsive to changes in speed of said driven shaft for initially closing said motor circuit to initiate a shift cycle, means operable upon initial closing of said circuit and consequent energization of the motor for causing reopening of the circuit after the operating shaft has been rotated through a predetermined degree of angularity and the shift cycle has been completed, and means connecting said operating shaft and gear shift element for effecting gear shift operations during movements of the operating shaft.

21. In a system including an internal combustion engine, a transmission mechanism connected to said engine and including a driving shaft and a driven shaft, means interposed between said shafts and operative to couple the former to the latter at various speed ratios and including a gear shift element movable in one direction to effect a transmission up-shift and movable in the opposite direction to effect a transmission down-shift, a throttle valve for controlling the power supplied by said engine, cyclicly operable electrical means controlling the displacement of said gear shift element, said electrical means including a reversible electric motor, means operatively connecting said motor and gear shift element and operable when said motor is operated in one direction to move the element and effect a transmission up-shift and operable when said motor is operated in the other direction to move said element and effect a transmission down-shift, a pair of normally open electric circuits for said motor and adapted when closed to pass electric current through said motor in opposite directions respectively to operate the motor in opposite directions, a reversing switch movable between two positions, means operable when the reversing switch is in one position for selecting one of said circuits for subsequent closure, means operable when said reversing switch is in the other position for selecting the other circuit for subsequent closure, means operable upon rotation of the motor in either direction upon completion of a transmission up-shift or down-shift for actuating said reversing switch to select one of said circuits to condition the motor for rotation in the opposite direction, means operable when the speed of the driven shaft exceeds a predetermined minimum and said throttle valve is substantially closed for completing the selected motor circuit to effect a transmission up-shift, and means operable when the speed of the driven shaft falls below a predetermined speed of rotation for closing the selected motor circuit to effect a transmission down-shift.

22. In combination, a drive shaft and a driven shaft, means interposed between said shafts and operable to couple the former to the latter at various speed ratios and including a gear shift element movable in one direction to effect a transmission up-shift and movable in the opposite direction to effect a transmission down-shift, cyclicly operable control mechanism for said gear shift element including a reversible electric motor, a rotatable operating shaft, means operatively connecting said motor and operating shaft in driving relationship, a pair of normally open circuits adapted when energized to supply current of opposite polarity to said motor, a normally open control circuit for each of said motor circuits adapted upon closing thereof to close its respective motor circuit, a reversing switch common to said control circuits and operable upon successive actuation thereof to alternately potentially close said control circuits, means operable upon rotation of the motor in either direction and upon completion of a transmission up-shift or down-shift for actuating said reversing switch, and means operable when the speed of the driven shaft exceeds or falls below a predetermined speed of rotation for closing the potentially closed control circuit.

23. In a transmission, a drive shaft, a driven shaft, means interposed between said shafts and operative to couple the former to the latter at various speed ratios and including a gear shift element movable in one direction to effect a transmission up-shift and movable in the opposite direction to effect a transmission down-shift, an operating rock shaft mounted for oscillation about an axis, a crank arm carried by said rock shaft, means operatively connecting the crank shaft and gear shift element whereby the oscillating movements of the rock shaft are translated into shifting movements of said gear shift element, a shift finger carried by and movable with said rock shaft from one extreme position to another and vice versa, a cam mounted for oscillation about an axis, said shift finger being positioned in the path of movement of said cam and adapted to cooperate therewith whereby oscillating movement of the cam in one direction will cause movement of said shift finger in one direction to effect a transmission up-shift and whereby oscillating movement of the cam in the opposite direction will cause movement of the finger to cause a transmission down-shift, and means for oscillating said cam in either direction.

24. In a transmission, a drive shaft, a driven shaft, means interposed between said shafts and operative to couple the former to the latter at various speed ratios and including a gear shift element movable in one direction to effect a transmission up-shift and movable in the opposite direction to effect a transmission down-shift, an operating rock shaft mounted for oscillation about an axis, a crank arm carried by said rock shaft, means operatively connecting the rock shaft and gear shift element whereby the oscillating movements of the rock shaft are translated into shifting movements of said gear shift element, a shift finger carried by and movable with said rock shaft from one extreme position to another and vice versa, cam means for moving said shift finger in one direction or the other as said cam means is rotated in one direction or the other, power means for rotating said cam means, and control means responsive to the speed of the driven shaft for controlling said power means.

25. In a transmission, a drive shaft, a driven shaft, means interposed between said shafts and operative to couple the former to the latter at various speed ratios and including a gear shift element movable in one direction to effect a transmission up-shift and movable in the opposite direction to effect a transmission down-shift, an operating rock shaft mounted for oscillation about an axis, a crank arm carried by said rock shaft, means operatively connecting the crank shaft and gear shift element whereby the oscillating movements of the rock shaft are translated into shifting movements of said gear shift element, a shift finger carried by and movable with said rock shaft from one extreme position to another and vice versa, a disc mounted for oscillation about an axis, an abutment eccentrically carried by said disc, said shift finger being positioned in the path of movement of said abutment and adapted to cooperate therewith whereby oscillating movement of the disc in one direction will cause said abutment to engage one side of said shift finger and move the latter in a direction to effect a transmission up-shift and whereby oscillating movement of the disc in the opposite direction will cause said abutment to engage the other side of said shift finger and effect a transmission down-shift, and means operable under the control of said driven shaft for oscillating said disc in either direction.

26. In a transmission, a drive shaft and a driven shaft, means interposed between said shafts and operative to couple the former to the latter at various speed ratios and including a gear shift element movable in one direction to effect a transmission up-shift and movable in the opposite direction to effect a transmission down-shift, an operating rock shaft mounted for oscillation about an axis, a crank arm carried by said rock shaft, means operatively connecting the crank shaft and gear shift element whereby the oscillating movements of the rock shaft are translated into shifting movements of said gear shift element, a shift finger carried by and movable with said rock shaft from one extreme position to another and vice versa, a disc mounted for oscillation about an axis, an abutment eccentrically carried by said disc, said shift finger being positioned in the path of movement of said abutment and adapted to cooperate therewith whereby oscillating movement of the disc in one direction will cause said abutment to engage one side of said shaft finger and move the latter in a direction to effect a transmission up-shift and whereby oscillating movement of the disc in the opposite direction will cause said abutment to engage the other side of said shift finger and effect a transmission down-shift, means operable under the control of said driven shaft for oscillating said disc in either direction, there being a lost motion connection between said shift finger and rock shaft, and spring means effective to take up said lost motion connection in one direction when said shift finger is in one of its extreme positions and for taking up said lost motion connection in the opposite direction when said shift finger is in the other of its extreme positions.

27. In an automotive vehicle, a transmission including a drive shaft, a driven shaft, means interposed between said shafts and operative to couple the former to the latter at various speed ratios and including a gear shift element movable in one direction to effect a transmission up-shift and movable in the opposite direction to effect a transmission down-shift, an operating rock shaft mounted for oscillation about an axis, a crank arm carried by said rock shaft, means operatively connecting the crank shaft and gear shift element whereby the oscillating movements of the rock shaft are translated into shifting movements of the gear shift element, a source of power for operating said transmission, a clutch mechanism operable when engaged to connect said source of power to said drive shaft in driving relationship and when disengaged to disconnect said source of power from said drive shaft, means normally maintaining said clutch engaged under vehicle driving conditions, a shift finger carried by and movable with said rock shaft from one extreme position to another and vice versa, a cam mounted for oscillation about an axis, said shift finger being positioned in the path of movement of said cam and adapted to cooperate therewith whereby oscillating movement of the cam in one direction will cause movement of the shift finger in one direction to effect a transmission up-shift and whereby oscillating movement of the cam in the opposite direction will cause movement of the shift finger in the opposite direction to cause a transmission down-shift, a cam follower positioned in the path of movement of said cam and designed for cooperation therewith, said clutch including a shift collar movable from a retracted position wherein the clutch is engaged at power driving speeds to an advanced position wherein the clutch is disengaged, means operatively connecting said cam follower and shift collar, said cam follower being positioned in the path of movement of said cam and said cam being adapted during rotation thereof in either direction to engage said cam follower and move the same initially in a direction to move said shift collar and cause clutch disengagement and to thereafter release said cam follower to permit movement of said shift collar and effect clutch disengagement, and means operable under the control of said driven shaft for oscillating said cam in either direction.

28. In an automotive vehicle, a transmission including a drive shaft, a driven shaft, means interposed between said shafts and operative to couple the former to the latter at various speed ratios and including a gear shift element movable in one direction to effect a transmission up-shift and movable in the opposite direction to effect a transmission down-shift, an operating rock shaft mounted for oscillation about an axis, a crank arm carried by said rock shaft, means operatively connecting the crank shaft and gear shift element whereby the oscillating movements of the rock shaft are translated into shifting movements of the gear shift element, a source of power for operating said transmission, a clutch mechanism operable when engaged to connect said source of power to said drive shaft in driving relationship and when disengaged to disconnect said source of power from said drive shaft, means normally maintaining said clutch engaged under vehicle driving conditions, cyclicly operable means for oscillating said rock shaft first in one direction through a complete shift cycle to effect a transmission up-shift and then in the other direction throughout a complete shift cycle to effect a transmission down-shift and vice versa, and means operable during each shift cycle in either direction for disengaging said clutch against the action of said clutch engaging means and for thereafter releasing said clutch to allow said clutch engaging means to become effective.

29. In an automotive vehicle, a transmission including a drive shaft, a driven shaft, means interposed between said shafts and operative to couple the former to the latter at various speed ratios and including a gear shift element movable in one direction to effect a transmission up-shift and movable in the opposite direction to effect a transmission down-shift, an operating rock shaft mounted for oscillation about an axis, a crank arm carried by said rock shaft, means operatively connecting the crank shaft and gear shift element whereby the oscillating movements of the rock shaft are translated into shifting movements of the gear shift element, a source of power for operating said transmission, a clutch mechanism operable when engaged to connect said source of power to said drive shaft in driving relationship and when disengaged to disconnect said source of power from said drive shaft, means normally maintaining said clutch engaged under vehicle driving conditions, cyclicly operable cam means for oscillating said rock shaft first in one direction through a complete shift cycle to effect a transmission up-shift and then in the other direction through a complete shift cycle to effect a transmission down-shift and vice versa, and cam means operable during each shift cycle in either direction for disengaging said clutch against the action of said clutch engaging means and for thereafter releasing said clutch to allow said clutch engaging means to become effective.

30. In an automotive vehicle, in combination, a transmission including a drive shaft, a driven shaft, means interposed between said shafts and operative to couple the former to the latter at various speed ratios and including a gear shift element movable in one direction to effect a transmission up-shift and movable in the opposite direction to effect a transmission down-shift, an operating rock shaft mounted for oscillation about an axis, a crank arm carried by said rock shaft, means operatively connecting the crank shaft and gear shift element whereby the oscillating movements of the rock shaft are translated into shifting movements of the gear shift element, a motor for operating said transmission, a centrifugal clutch mechanism normally disengaged at motor idling speeds and normally engaged at motor driving speeds and operable when engaged to connect said motor to said drive shaft in driving relationship and when disengaged to disconnect said motor from said drive shaft, a shift finger carried by and movable with said rock shaft from one extreme position to another and vice versa, a cam mounted for oscillation about an axis, said shift finger being positioned in the path of movement of said cam and adapted to cooperate therewith whereby oscillating movement of the cam in one direction will cause movement of the shift finger in one direction to effect a transmission up-shift and whereby oscillating movement of the cam in the opposite direction will cause movement of the shift finger in the opposite direction to cause a transmission down-shift, a cam follower positioned in the path of movement of said cam and designed for cooperation therewith, said clutch including a shift collar movable from a retracted position wherein the clutch is engaged at motor driving speeds to an advanced position wherein the clutch is disengaged, means operatively connecting said cam follower and shift collar, said cam follower being positioned in the path of movement of said cam and said cam being adapted during rotation thereof in either direction to engage said cam follower and move the same initially in a direction to move said shift collar and cause clutch disengagement and to thereafter release said cam follower to permit movement of said shift collar and effect clutch disengagement, and means operable under the control of the speed of rotation of said driven shaft for oscillating said cam in either direction.

31. In an automotive vehicle, a transmission including a drive shaft, a driven shaft, means interposed between said shafts and operative to couple the former to the latter at various speed ratios and including a gear shift element movable in one direction to effect a transmission up-shift and movable in the opposite direction to effect a transmission down-shift, an operating rock shaft mounted for oscillation about an axis, a crank arm carried by said rock shaft, means operatively connecting the crank shaft and gear shift element whereby the oscillating movements of the rock shaft are translated into shifting movements of the gear shift element, a motor for operating said transmission, a centrifugal clutch mechanism operable when engaged to connect said source of power to said drive shaft in driving relationship and when disengaged to disconnect said source of power from said drive shaft, said clutch including a shift collar movable from a retracted position wherein the clutch is engaged to an intermediate position wherein the clutch is disengaged at motor idling speeds to a final position wherein the clutch is disengaged, retractable means positioned in the path of movement of said collar for limiting movement of said collar to a position wherein the clutch is disengaged at power idling speeds, a shift finger carried by and movable with said rock shaft from one extreme position to another and vice versa, a cam mounted for oscillation about an axis, said shift finger being positioned in the path of movement of said cam and adapted to cooperate therewith whereby oscillating movement of the cam in one direction will cause movement of the shift finger in one direction to effect a transmission up-shift and whereby oscillating movement of the cam in the opposite direction will cause movement of the shift finger in the opposite direction to cause a transmission down-shift, a cam follower positioned in the path of movement of said cam and designed for cooperation therewith, said clutch including a shift collar movable from a retracted position wherein the clutch is engaged to an advanced position wherein the clutch is disengaged, means operatively connecting said cam follower and shift collar, said cam follower being positioned in the path of movement of said cam and said cam being adapted during rotation thereof in either direction to engage said cam follower and move the same initially in a direction to move said shift collar and cause clutch disengagement and to thereafter release said cam follower to permit movement of said shift collar to its position as limited by said retractable means and effect clutch disengagement, and means operable under the control of the speed of rotation of said driven shaft for oscillating said cam in either direction.

32. In an automotive vehicle, in combination, a transmission having a casing, a clutch assembly having a housing, said casing and housing having wall portions positioned in close proximity to each other, said transmission including a gear shift element movable in one direction to effect a transmission up-shift and movable in the opposite direction to effect a transmission down-shift, an operating rock shaft mounted for oscillation about an axis, a crank arm carried by said rock shaft, means operatively connecting the crank shaft and gear shift element whereby oscillating movements of the rock shaft are translated into shifting movements of the gear shift element, a shift finger carried by and movable with said rock shaft from one extreme position to another and vice versa, a cyclicly operable cam disc mounted for oscillation about an axis, an abutment eccentrically mounted on said cam disc, said shift finger being positioned in the path of movement of said abutment and adapted to cooperate therewith whereby oscillating movement of the cam disc in one direction will cause said abutment to engage one side of said shift finger to move the same in a direction to cause a transmission up-shift and whereby oscillating movement of the cam disc in the opposite direction will cause said abutment to engage the other side of said shift finger and effect a transmission down-shift, a cam follower designed for cooperation with said cam disc, said clutch including a shift element movable from one extreme position wherein the clutch is engaged to another extreme position wherein the clutch is disengaged, yieldable means normally urging said clutch to its position of clutch engagement, means projecting through said casing and housing and operatively connecting said cam follower and clutch shift element for causing the latter to follow the movements of the former, the position of said abutment on said cam disc and the contour of the cam disc being such that during oscillation of the cam disc in either direction throughout a shift cycle said clutch shift element will be removed from a position of clutch engagement to a position of clutch disengagement against the action of said yielding means and returned to its position of clutch engagement under the action of said yielding means during movement of said shift finger, and means for alternately oscillating said cam disc in opposite directions throughout one complete revolution.

33. In an automotive vehicle, in combination, a transmission, a clutch assembly, said transmission including a gear shift element movable in one direction to effect a transmission up-shift and movable in the opposite direction to effect a transmission down-shift, an operating rock shaft mounted for oscillation about an axis, a crank arm carried by said rock shaft, means operatively connecting the crank shaft and gear shift element whereby oscillating movements of the rock shaft are translated into shifting movements of said gear shift element, a shift finger carried by and movable with said rock shaft from one extreme position to another and vice versa, a cyclicly operable cam disc mounted for oscillation about an axis, an abutment eccentrically mounted on said cam disc, said shift finger being positioned in the path of movement of said abutment and adapted to cooperate therewith whereby oscillating movement of the cam disc in one direction will cause said abutment to engage one side of said shift finger to move the same in a direction to cause a transmission up-shift and whereby oscillating movement of the cam disc in the opposite direction will cause said abutment to engage the other side of said shift finger and effect a transmission down-shift, a cam follower designed for cooperation with said cam disc, said clutch including a shift element movable from one extreme position wherein the clutch is engaged to another extreme position wherein the clutch is disengaged, yieldable means normally urging said clutch to its position of clutch engagement, means operatively connecting said cam follower and clutch shift element for causing the latter to follow the movements of the former, the position of said abutment on said cam disc and the contour of the cam disc being such that during oscillation of the cam disc in either direction throughout a shift cycle said clutch shift element will be moved from a position of clutch engagement to a position of clutch disengagement against the action of said yielding means and returned to its position of clutch engagement under the action of said yielding means during movement of said shift finger, and means for alternately oscillating said cam disc in opposite directions throughout one complete revolution.

34. In an automotive vehicle, in combination, a transmission having a casing, a clutch assembly having a housing, said casing and housing having wall portions positioned in close proximity to each other, said transmission including a gear shift element movable in one direction to effect a transmission up-shift and movable in the opposite direction to effect a transmission down-shift, an operating rock shaft mounted for oscillation about an axis, a crank arm carried by said rock shaft, means operatively connecting the crank shaft and gear shift element whereby oscillating movements of the rock shaft are translated into shifting movements of the gear shift element, a shift finger carried by and movable with said rock shaft from one extreme position to another and vice versa, a cyclicly operable cam disc mounted for oscillation about an axis, an abutment eccentrically mounted on said cam disc, said shift finger being positioned in the path of movement of said abutment and adapted to cooperate therewith whereby oscillating movement of the cam disc in one direction will cause said abutment to engage one side of said shaft finger to move the same in a direction to cause a transmission up-shift and whereby oscillating movement of the cam disc in the opposite direction will cause said abutment to engage the other side of said shift finger and effect a transmission down-shift, a cam follower designed for cooperation with said cam disc, said clutch including a shift element movable from one extreme position wherein the clutch is engaged to another extreme position wherein the clutch is disengaged, yieldable means normally urging said clutch to its position of clutch engagement, there being aligned openings in said casing and housing, a thrust member projecting through said openings and bearing at one end against said cam follower and effectively bearing at its other end against said clutch shift element for causing the latter to follow the movements of the cam follower, the position of said abutment on said cam disc and the contour of said cam disc being such that during oscillation of the cam disc in either direction throughout a shift cycle, said clutch shift element will be moved from a position of clutch engagement to a position of clutch disengagement against the action of said yielding means and returned to its position of clutch engagement under the action of said yielding means during movement of said shift finger, an impervious diaphragm having its central portions secured to said thrust rod and its peripheral portions secured to the inner wall of one of said aligned openings to prevent passage of lubricant from said housing to said casing and vice versa, and means for alternately oscillating said cam disc in opposite directions throughout one complete revolution.

35. In an automotive vehicle, in combination, a transmission, a clutch assembly, said transmission including a gear shift element movable in one direction to effect a transmission up-shift and movable in the opposite direction to effect a transmission down-shift, an operating rock shaft mounted for oscillation about an axis, a crank arm carried by said rock shaft, means operatively connecting the crank shaft and gear shift element whereby oscillating movements of the rock shaft are translated into shifting movements of said gear shift element, a shift finger carried by and movable with said rock shaft from one extreme position to another and vice versa, a cyclicly operable cam disc mounted for oscillation about an axis, an abutment eccentrically mounted on said cam disc, said shift finger being positioned in the path of movement of said abutment and adapted to cooperate therewith whereby oscillating movement of the cam disc in one direction will cause said abutment to engage one side of said shift finger to move the same in a direction to cause a transmission up-shift and whereby oscillating movement of the cam disc in the opposite direction will cause said abutment to engage the other side of said shift finger and effect a transmission down-shift, a cam follower designed for cooperation with said cam disc, said clutch including a shift element movable from one extreme position wherein the clutch is engaged to another extreme position wherein the clutch is disengaged, yieldable means normally urging said clutch to its position of clutch engagement, a thrust finger having one end thereof bearing against said cam follower, a rocker element mounted for oscillation about an axis, an arm carried by said rocker element and against which the other end of said thrust finger bears, a throw-out fork carried by said rocker element and bearing against said clutch shift collar whereby said collar is constrained to follow the movements of said cam follower, a one-way acting dashpot connected to said rocker element, the position of said abutment on said cam disc and the contour of said cam disc being such that during oscillation of the cam disc in either direction throughout a shift cycle said clutch shift element will be moved from a position of clutch engagement to a position of clutch disengagement against the action of said yielding means and returned to its position of clutch engagement under the action of said yielding means during movement of said shift finger, said dashpot assembly serving to retard the return of said clutch collar to its initial position, and means for alternately oscillating said cam disc in opposite directions throughout one complete revolution.

36. In an automotive vehicle, in combination, a transmission including a gear shift element movable in one direction to effect a transmission up-shift and movable in the opposite direction to effect a transmission down-shift, an operating rock shaft mounted for oscillation about an axis, a crank arm carried by said rock shaft, means operatively connecting the crank shaft and gear shift element whereby oscillating movements of the rock shaft are translated into shifting movements of the gear shift element, a shift finger carried by and movable with said rock shaft from one extreme position to another and vice versa, a clutch assembly capable of clutch throw-out and re-entry operations, a shift collar movable from a position wherein the clutch is engaged to a position wherein the clutch is disengaged, yieldable means normally urging said collar to its position of clutch engagement, a cam disc mounted for oscillation about an axis, a cam follower for said disc, means operatively connecting said cam follower and clutch collar whereby the latter is constrained to follow the movements of the former, an abutment eccentrically mounted on said cam disc, said shift finger being positioned in the path of movement of said abutment and adapted to cooperate therewith whereby oscillating movement of the cam disc in one direction will cause said abutment to engage one side of said shift finger to move the same in a direction to cause a transmission up-shift and whereby oscillating movement of the cam disc in the opposite direction will cause said abutment to engage the other side of said shift finger and effect a transmission down-shift, and means normally maintaining said cam disc in a position wherein said abutment lies in a plane which bisects the angle created by the longitudinal axis of said shift finger in each of its extreme positions, the contour of said cam disc being such that during oscillation of the cam disc in either direction, a clutch throw-out and clutch re-entry operation will take place during engagement of said abutment with said shift finger.

37. In combination, a transmission including a driving shaft, a driven shaft, means interposed between said shafts and operative to couple the former to the latter at various speed ratios and including a gear shift element movable in one direction to effect a transmission up-shift and movable in the opposite direction to effect a transmission down-shift, cyclicly operable mechanism controlling the displacements of said gear shift element and including a reversible electric motor having an armature and a field winding, means operatively connecting said motor and element and operable when said motor is operated in one direction to effect a shift cycle and move the element to complete a transmission up-shift and operable when said motor is operated in the other direction to effect a shift cycle and move said element to complete a transmission down-shift, a normally open motor armature circuit, a pair of normally open motor field circuits adapted when closed to pass electric current through said field winding in opposite directions, relay means for each of said field circuits operable when energized to close its respective field circuit, relay means for said armature circuit operable when energized to close the latter, means operable upon closing of either of said field circuits for energizing the armature relay means, a reversing switch movable between two positions to select either of said field relay means for subsequent energization, means operable upon rotation of the motor in either direction for actuating said reversing switch, and means operable when the speed of the driven shaft falls below or exceeds predetermined speeds of rotation for energizing the selected field relay means.

38. In combination, a transmission including a driving shaft, a driven shaft, means interposed between said shafts and operative to couple the former to the latter at various speed ratios and including a gear shift element movable in one direction to effect a transmission up-shift and movable in the opposite direction to effect a transmission down-shift, cyclicly operable mechanism controlling the displacements of said gear shift element and including a reversible electric motor having an armature and a field winding, means operatively connecting said motor and element and operable when said motor is operated in one direction to effect a shift cycle and move the element to complete a transmission up-shift and operable when said motor is operated in the other direction to effect a shift cycle and move said element to complete a transmission down-shift, a normally open motor armature circuit, a pair of normally open motor field circuits adapted when closed to pass electric current through said field winding in opposite directions, relay means for each of said field circuits operable when energized to close its respective field circuit, relay means for said armature circuit operable when energized to close the latter, means operable upon closing of either of said field circuits for energizing the armature relay means, a reversing switch movable between two positions to select either of said field relay means for subsequent energization, means operable upon rotation of the motor in either direction for actuating said reversing switch, means operable when the speed of the driven shaft falls below or exceeds predetermined speeds of rotation for energizing the selected field relay means, and means operable upon energization of the motor armature and field circuits and immediately prior to movement of said gear shift element for intermittently interrupting the flow of current through said armature circuit to reduce the speed of rotation of the motor armature.

39. In combination, a transmission including a driving shaft, a driven shaft, means interposed between said shafts and operative to couple the former to the latter at various speed ratios and including a gear shift element movable in one direction to effect a transmission up-shift and movable in the opposite direction to effect a transmission down-shift, cyclicly operable mechanism controlling the displacements of said gear shift element and including a reversible electric motor having an armature and a field winding, means operatively connecting said motor and element and operable when said motor is operated in one direction to effect a shift cycle and move the element to complete a transmission up-shift and operable when said motor is operated in the other direction to effect a shift cycle and move said element to complete a transmission down-shift, a normally open motor armature circuit, a pair of normally open motor field circuits adapted when closed to pass electric current through said field winding in opposite directions, relay means for each of said field circuits operable when energized to close its respective field circuit, relay means for said armature circuit operable when energized to close the latter, means operable upon closing of either of said field circuits for energizing the armature relay means, a reversing switch movable between two positions to select either of said field relay means for subsequent energization, means operable upon rotation of the motor in either direction for actuating said reversing switch, means operable when the speed of the driven shaft falls below or exceeds predetermined speeds of rotation for energizing the selected relay means, and means operable upon energization of the motor armature and field circuits and immediately prior to movement of said gear shift element for intermittently interrupting the flow of current through said armature circuit to reduce the speed of rotation of the motor armature.

40. In combination, a transmission including a driving shaft, a driven shaft, means interposed between said shafts and operative to couple the former to the latter at various speed ratios and including a gear shift element movable in one direction to effect a transmission up-shift and movable in the opposite direction to effect a transmission down-shift, cyclicly operable mechanism controlling the displacements of said gear shift element and including a reversible electric motor having an armature and a field winding, means operatively connecting said motor and element and operable when said motor is operated in one direction to effect a shift cycle and move the element to complete a transmission up-shift and operable when said motor is operated in the other direction to effect a shift cycle and move said element to complete a transmission down-shift, a normally open motor armature circuit, a pair of normally open motor field circuits adapted when closed to pass electric current through said field winding in opposite directions, relay means for each of said field circuits operable when energized to close its respective field circuit, relay means for said armature circuit operable when energized to close the latter, means operable upon closing of either of said field circuits for energizing the armature relay means, a reversing switch movable between two positions to select either of said field relay means for subsequent energization, cam means operable upon rotation of the motor in either direction for actuating said reversing switch, means operable when the speed of the driven shaft falls below or exceeds predetermined speeds of rotation for energizing the selected field relay means, and means operable upon energization of the motor armature and field circuits and immediately prior to movement of said gear shift element for intermittently interrupting the flow of current through said armature circuit to reduce the speed of rotation of the motor armature.

41. In combination, a transmission including a driving shaft, a driven shaft, means interposed between said shafts and operative to couple the former to the latter at various speed ratios and including a gear shift element movable in one direction to effect a transmission up-shift and movable in the opposite direction to effect a transmission down-shift, cyclicly operable mechanism controlling the displacements of said gear shift element and including a reversible electric motor having an armature and a field winding, means operatively connecting said motor and element and operable when said motor is operated in one direction to effect a shift cycle and move the element to complete a transmission up-shift and operable when said motor is operated in the other direction to effect a shift cycle and move said element to complete a transmission down-shift, a normally open motor armature circuit, a pair of normally open motor field circuits adapted when closed to pass electric current through said field winding in opposite directions, relay means for each of said field circuits operable when energized to close its respective field circuit, relay means for said armature circuit operable when energized to close the latter, means operable upon closing of either of said field circuits for energizing the armature relay means, a reversing switch movable between two positions to select either of said field relay means for subsequent energization, cam means operable upon rotation of the motor in either direction for actuating said reversing switch, means operable when the speed of the driven shaft falls below or exceeds predetermined speeds of rotation for energizing the selected field relay means, and means operable upon energization of the motor armature and field circuits and immediately prior to movement of said gear shift element for intermittently interrupting the flow of current through said armature circuit to reduce the speed of rotation of the motor armature.

42. In combination, a drive shaft and a driven shaft, means interposed between said shafts and operative to couple the former to the latter at various speed ratios and including a gear shift element movable in one direction to effect a transmission up-shift and movable in the opposite direction to effect a transmission down-shift, cyclicly operable control mechanism for said gear shift element including a rotatable cam shaft, a reversible electric motor having an armature and field winding, means operatively connecting said motor and cam shaft in driving relationship, a normally open motor armature circuit, a pair of normally open motor field circuits adapted when closed to pass electric current through said field windings in opposite directions, normally open relay control circuits for said armature and field circuits respectively and operable upon closing thereof to close the respective circuits which they control, means operable upon closing of either of said field control circuits for closing said armature control circuit, a reversing switch common to said field control circuit, a reversing cam on said cam shaft controlling the operation of said reversing switch, said cam being operable upon rotation of the motor in either direction and upon completion of a transmission up-shift or down-shift to actuate said reversing switch to cause opening of one field control circuit and conditioning of the other field control circuit for subsequent closure and operation of the motor in the opposite direction, an interrupter cam on said cam shaft, a normally open interrupter circuit operable when closed to intermittently render said armature closing means inoperative to effect intermittent opening and closing of the armature circuit to reduce the speed of the motor, a pair of normally open contacts in said interrupter circuit adapted when closed to close said latter circuit, and means operable under the control of said interrupter cam for closing said last-mentioned pair of contacts during movement of said transmission element in either direction.

43. Cyclicly operable gear shifting control mechanism for an automotive vehicle having a clutch element movable in one direction to cause clutch disengagement and movable in the opposite direction to cause clutch re-entry, and having a transmission element movable in one direction to effect a transmission down-shift and movable in the opposite direction to effect a transmission up-shift, said control mechanism including a cam shaft mounted for rotation alternately in opposite directions during each succeeding shift cycle, a reversible electric motor, means operatively connecting said motor and cam shaft in driving relationship, a pair of normally open electric circuits for the motor adapted when closed to pass electric current through the motor in opposite directions and initiate an up-shift or a down-shift cycle, control circuit means for the motor circuits including a reversing switch operable between two positions to condition the motor circuits for reversal of the motor during each succeeding shift cycle, means operable upon completion of one revolution of said cam shaft in either direction for actuating said reversing switch to open the existing motor circuit and to condition the other motor circuit for subsequent operation of the motor in the opposite direction during the next succeeding shift cycle, a clutch operating cam and a gear shift cam mounted on said cam shaft for rotation in unison therewith, a cam follower for said clutch operating cam, a linkage operatively connecting said cam follower and said movable clutch element, a cam follower for said gear shift cam, a linkage operatively connecting said latter cam follower and said movable gear shift element, said cams being operable during one complete revolution of said cam shaft in one direction to move said clutch element and cause clutch disengagement, to thereafter move said movable gear shift element and effect a transmission up-shift and to finally move said clutch element in the opposite direction and cause clutch re-entry, said cams also being operable during one complete revolution of said cam shaft in the opposite direction to move said movable clutch element and cause clutch disengagement, to thereafter move said movable gear shift element and effect a transmission down-shift and to finally move said clutch element in the opposite direction and cause clutch re-entry, said control circuit means being operable to initially close a conditioned motor circuit and initiate a shift cycle.

44. Cyclicly operable gear shifting control mechanism for an automotive vehicle having a clutch element movable in one direction to cause clutch disengagement and movable in the opposite direction to cause clutch re-entry, and having a transmission element movable in one direction to effect a transmission down-shift and movable in the opposite direction to effect a transmission up-shift, said control mechanism including a cam shaft mounted for rotation alternately in opposite directions during each succeeding shift cycle, a reversible electric motor, means operatively connecting said motor and cam shaft in driving relationship, control circuit means for the motor, said control circuit means being responsive to predetermined speeds of rotation of the driven shaft for energizing said motor to initiate a shift cycle, said control circuit means including a reversing switch, a reversing cam on said cam shaft operable upon completion of one revolution of the cam shaft in either direction for actuating said reversing switch to cause said control circuit means to stop the motor and condition the same for subsequent operation in the opposite direction during a next succeeding shift cycle, a clutch operating cam and a gear shift cam mounted on said cam shaft for rotation in unison therewith, a cam follower for said clutch operating cam, a linkage operatively connecting said cam follower and movable clutch element, and a cam follower for said gear shift cam, a linkage operatively connecting said latter cam follower and said movable gear shift element, said cams being operable during one complete revolution of the cam shaft in either direction to move said clutch element and cause clutch disengagement to thereafter move said gear shift element and effect a transmission gear shift and to finally move said clutch element in the opposite direction and cause clutch re-entry.

45. Cyclicly operable gear shifting control mechanism for an automotive vehicle having a clutch element movable in one direction to cause clutch disengagement and movable in the opposite direction to cause clutch re-entry, and having a transmission element movable in one direction to effect a transmission down-shift and movable in the opposite direction to effect a transmission up-shift, said control mechanism including a cam shaft mounted for rotation alternately in opposite directions during each succeeding shift cycle, a reversible electric motor, means operatively connecting said motor and cam shaft in driving relationship, control circuit means for the motor, said control circuit means being responsive to predetermined speeds of rotation of the driven shaft for causing energization of said motor to initiate a shift cycle, said control circuit means including a reversing switch, a reversing cam on said cam shaft operable upon completion of one revolution of the cam shaft in either direction for actuating said reversing switch to cause said control circuit means to stop the motor and condition the same for subsequent operation in the opposite direction during a next succeeding shift cycle, a clutch operating cam and a gear shift cam mounted on said cam shaft for rotation in unison therewith, a cam follower for said clutch operating cam, a linkage operatively connecting said cam follower and movable clutch element, a cam follower for said gear shift cam, a linkage operatively connecting said latter cam follower and said movable gear shift element, said cams being operable during one complete revolution of the cam shaft in either direction to move said clutch element and cause clutch disengagement to thereafter move said gear shift element and effect a transmission gear shift and to finally move said clutch element in the opposite direction and cause clutch re-entry, said control circuit means including means operable immediately prior to gear shift operations in the shift cycle to cause intermittent operation of the motor to reduce the speed of the motor armature.

46. In a transmission, the combination of a driving shaft, a driven shaft, means providing a power train between said shafts and comprising a positive dual clutch for completing the power train and including a movable toothed part adapted to be selectively moved in one direction into mesh with another toothed part to effect a transmission up-shift and in the opposite direction into mesh with another toothed part to effect a transmission down-shift, a synchronizer ring between said movable toothed part and each of said other toothed parts and having blocker teeth for preventing engagement of the parts prior to synchronization thereof and requiring a substantial force to be imposed on the movable toothed part to effect such synchronization, control mechanism for effecting selective movement of the movable toothed part and including a reversible electric motor having an armature, an armature circuit for the motor, means operatively connecting the motor and movable toothed part in driving relationship, and means for applying current impulses intermittently to said armature circuit to cause intermittent applications of driving torque to be applied to the motor armature 47. In a transmission, the combination of a driving shaft, a driven shaft, means providing a power train between said shafts and comprising a positive clutch for completing the power train and including a movable toothed part adapted to be selectively moved into mesh with another toothed part to effect a transmission shift, a synchronizer ring between said movable toothed part and the other toothed part and having blocker teeth for preventing engagement of the parts prior to synchronization thereof and requiring a substantial force to be imposed on the movable toothed part to effect such synchronization, control mechanism for effecting movement of the movable toothed part and including an electric motor, means operatively connecting the motor and movable toothed part in driving relationship, a circuit for the motor, and a vibrating relay device disposed in said circuit for applying intermittent current impulses to the latter to apply intermittent applications of torque to the motor.

48. In a transmission, the combination of a driving shaft, a driven shaft, means providing a power train between said shafts and comprising a positive clutch for completing the power train and including a movable toothed part adapted to be selectively moved in one direction into mesh with another toothed part to effect a transmission up-shift and in the opposite direction into mesh with another toothed part to effect a transmission down-shift, a synchronizer ring between said movable toothed part and each of said other toothed parts and having blocker teeth for preventing engagement of the parts prior to synchronization thereof and requiring a substantial force to be imposed on the movable toothed part to effect such synchronization, control mechanism for effecting movement of the movable toothed part and including a reversible electric motor having an armature and field windings, means operatively connecting the motor and movable toothed part in driving relationship, a field circuit for the motor, an armature circuit for the motor, means for selectively applying current of opposite polarity to the field circuit to energize the same, and means for applying intermittent current impulses to the armature circuit of the motor during such application of current of either polarity to the field circuit of the motor.

49. The combination with a transmission having a movable gear shift element movable from one extreme position wherein the transmission assumes one gear ratio through a neutral position to another extreme position wherein the transmission assumes a different gear ratio and vice versa, of electrical control means for moving said element to effect a transmission up-shift or a transmission down-shift and including an electric motor having an armature circuit and a field circuit, means operatively connecting said motor and gear shift element in driving relationship wherein rotation of the motor in one direction will move the element in a direction to effect a transmission up-shift and rotation of the motor in the other direction will move the element to effect a transmission down-shift, means for passing electrical current through said armature circuit and for simultaneously and selectively passing electrical current through said field circuit in either direction to effect a transmission up-shift or a transmission down-shift as the case may be, and means automatically operable during movement of said gear shift element in either direction for intermittently interrupting the flow of current through said armature circuit to reduce the speed of rotation of the motor.

50. The combination with a transmission having a movable gear shift element movable from one extreme position wherein the transmission assumes one gear ratio through a neutral position to another extreme position wherein the transmission assumes a different gear ratio and vice versa, of electrical control means for moving said element to effect a transmission up-shift or a transmission down-shift and including an electric motor having an armature circuit and a field circuit, means operatively connecting said motor and gear shift element in driving relationship wherein rotation of the motor in one direction will move the element in a direction to effect a transmission up-shift and rotation of the motor in the other direction will move the element to effect a transmission down-shift, means for passing electrical current through said armature circuit and for simultaneously and selectively passing electrical current through said field circuit in either direction to effect a transmission up-shift or a transmission down-shift as the case may be, the means automatically operable under the control of said motor during movement of said gear shift element in either direction for intermittently interrupting the flow of current through said armature circuit to reduce the speed of rotation of the motor.

51. The combination with a transmission having a movable gear shift element movable from one extreme position wherein the transmission assumes one gear ratio through a neutral position to another extreme position wherein the transmission assumes a different gear ratio and vice versa, of electrical control means for moving said element to effect a transmission up-shift or a transmission down-shift and including an electric motor having an armature circuit and a field circuit, means operatively connecting said motor and gear shift element in driving relationship wherein rotation of the motor in one direction will move the element in a direction to effect a transmission up-shift and rotation of the motor in the other direction will move the element to effect a transmission down-shift, means for passing electrical current through said armature circuit and for simultaneously and selectively passing electrical current through said field circuit in either direction to effect a transmission up-shift or a transmission down-shift as the case may be, and a vibrating relay device including a pair of contacts disposed in said armature circuit and operable during movement of said gear shift element in either direction to intermittently open and close its contacts to interrupt the flow of current through said armature circuit and reduce the speed of rotation of said motor.

52. In a system including an internal combustion engine having an ignition system including an ignition coil, a transmission including a driving shaft and a driven shaft, means interposed between said shafts and operative to couple the former to the latter at various speed ratios and including a gear shift element movable from a neutral position in one direction to one extreme position to effect one gear ratio and movable in the opposite direction to another extreme position from its neutral position to effect another gear ratio, a cyclically operable electric motor controlling the displacement of said gear shift element and means operable during movement of said gear shift element by said electrical means from one extreme position thereof to the other extreme position for rendering said ignition coil inoperative during movement of said gear shift element through its neutral position.

53. In an automotive vehicle, including vehicle driving wheels, an internal combustion engine, a transmission mechanism connected to said engine and including a driving shaft and a driven shaft, means operatively connecting the driven shaft and wheels in driving relationship, means interposed between said shafts and operative to couple the former to the latter at various speed ratios and including a gear shift element movable in one direction to effect a transmission up-shift and movable in the opposite direction to effect a transmission down-shift, a throttle valve for controlling the power supplied by said engine, a depressible brake pedal for applying braking torque to the vehicle wheels upon depression thereof, electrical means controlling the displacement of said gear shift element, said electrical means being operable when the speed of said driven shaft falls below a predetermined speed to move said gear shift element in one direction and effect a transmission down-shift, said electrical means being operable when the speed of said driven shaft exceeds a predetermined speed and said throttle valve is substantially closed to move the gear shift element in the opposite direction and effect a transmission up-shift, and means operable when said brake pedal is depressed for rendering said electrical means inoperative to effect a transmission up-shift.

54. In an automotive vehicle, including vehicle driving wheels, an internal combustion engine, a transmission mechanism connected to said engine and including a driving shaft and a driven shaft, means operatively connecting the driven shaft and wheels in driving relationship, means interposed between said shafts and operative to couple the former to the latter at various speed ratios and including clutch means and a gear shift element movable in one direction to effect a transmission up-shift and movable in the opposite direction to effect a transmission down-shift, a throttle valve for controlling the power supplied by said engine and movable from a closed to an open position, electrical means controlling the operation of said clutch means and the displacement of said gear shift element, said electrical means being operable when the speed of said driven shaft exceeds a predetermined speed and said throttle valve is substantially closed to operate said clutch means and to move the gear shift element in one direction and effect a transmission up-shift, said electrical means being operable when the speed of the driven shaft falls below a predetermined speed to operate said clutch means and to move said gear shift element and effect a transmission down-shift, spring means normally urging said throttle valve toward its closed position, and a one-way acting dashpot assembly for retarding the closing movements of said throttle valve long enough to prevent substantial reversal of torque prior to operation of said clutch.

55. In combination, a transmission including a driving shaft and a driven shaft, means interposed between said shafts and operable to couple the former to the latter at various speed ratios and including a gear shift element movable in one direction to effect a transmission up-shift and movable in the opposite direction to effect a transmission down-shift, and electrical means controlling the displacement of said gear shift element, said electrical means comprising a reversible electric motor having an armature and a field winding, an operating shaft mounted for oscillation about an axis, means operatively connecting said motor and operating shaft, means operatively connecting said operating shaft and gear shift element whereby one complete revolution of the operating shaft in one direction will cause movement of the gear shift element to effect a transmission up-shift and whereby one complete revolution of the operating shaft in the opposite direction will cause movement of the gear shift element to cause a transmission down-shift, a normally open armature circuit, a pair of normally open fields circuits respectively operable upon closing thereof to pass electrical current through said field winding in opposite directions, means operable upon energization of said field winding from either field circuit for closing the armature circuit to operate the motor, a normally open control circuit for each of said field circuits operable upon closing thereof to energize its respective field circuit, a holding circuit for each control circuit operable upon initial closing of its respective control circuit to maintain said latter circuit closed, means operable under the control of said operating shaft for alternately selecting and conditioning said control circuits for subsequent closure, and means operable under the control of said driven shaft for closing a selected control circuit, said selecting means also being operable to open the holding circuit for the selected control circuit to in turn open all of the motor circuits and deenergize the motor at the end of each complete revolution of said operating shaft.

56. In combination, a transmission including a driving shaft and a driven shaft, means interposed between said shafts and operable to couple the former to the latter at various speed ratios and including a gear shift element movable in one direction to effect a transmission up-shift and movable in the opposite direction to effect a transmission down-shift, and electrical means controlling the displacement of said gear shift element, said electrical means comprising a reversible electric motor having an armature and a field winding, an operating shaft mounted for oscillation about an axis, means operatively connecting said motor and operating shaft, means operatively connecting said operating shaft and gear shift element whereby one complete revolution of the operating shaft in one direction will cause movement of the gear shift element to effect a transmission up-shift and whereby one complete revolution of the operating shaft in the opposite direction will cause movement of the gear shift element to cause a transmission down-shift, a normally open armature circuit, a pair of normally open field circuits respectively operable upon closing thereof to pass electrical current through said field winding in opposite directions, means operable upon energization of said field winding from either field circuit for closing the armature circuit to operate the motor, a normally open control circuit for each of said field circuits operable upon closing thereof to energize its respective field circuit, a holding circuit for each control circuit operable upon initial closing of its respective control circuit to maintain said latter circuit closed, means operable under the control of said operating shaft for alternately selecting and conditioning said control circuits for subsequent closure, means operable under the control of said driven shaft for closing a selected control circuit, said selecting means also being operable to open the holding circuit for the selected control circuit to in turn open all of the motor circuits and deenergize the motor at the end of each complete revolution of said operating shaft, and friction braking means for preventing overrunning of said operating shaft after the same has been completed one revolution in each direction.

57. In a system including an internal combustion engine, a transmission mechanism connected to said engine and including a driving shaft and a driven shaft, means interposed between said shafts and operative to couple the former to the latter at various speed ratios and including a gear shift element movable in one direction to effect a transmission up-shift and movable in the opposite direction to effect a transmission down-shift, a normally closed throttle valve for controlling the power supplied by said engine, a governor operable under the control of said driven shaft, cyclicly operable electrical means controlling the displacement of said gear shift element, said electrical means comprising a reversible electric motor having an armature and a field winding, an operating shaft mounted for oscillation about an axis, means operatively connecting said operating shaft and gear shift element whereby one complete revolution of said operating shaft will effect a shift cycle and cause movement of the gear shift element to cause a transmission up-shift and whereby one complete revolution of the operating shaft in the opposite direction will effect a shift cycle and cause movement of the gear shift element to cause a transmission down-shift, a normally open armature circuit, a pair of normally open field circuits respectively operable upon closing thereof to pass electrical current through said field winding in opposite directions, means operable upon energization of said field winding from either field circuit for closing the armature circuit to operate the motor and initiate a shift cycle, a normally open up-shift control circuit for one of said field circuits, a normally open down-shift control circuit for the other field circuit, said control circuits being operable upon closing thereof to energize their respective field circuits, a holding circuit for each control circuit operable upon initial closing of its respective control circuit to maintain the latter closed, an accelerator switch including a pair of normally open contacts and a pair of normally closed contacts, said contacts assuming their normal position when said throttle valve is closed, and reversing their position when the throttle valve is open, a governor switch including a first pair of contacts which remain closed when the speed of said driven shaft is below a predetermined speed and which become open when the speed of said driven shaft exceeds said predetermined speed, and also having a second pair of contacts which remain open when the speed of the driven shaft exceeds a predetermined speed and which become closed when the speed of the driven shaft falls below said latter predetermined speed, said up-shift control circuit including said normally closed accelerator switch contacts and said first pair of governor switch contacts, said down-shift control circuit including said normally open accelerator contacts and said second pair of governor switch contacts, a reversing switch common to said field control circuits and movable between one position wherein it serves to potentially close the up-shift field control circuit to a position wherein it serves to potentially close the down-shift field control circuit, and means operable under the control of said operating shaft for reversing the position of said reversing switch at the end of each shift cycle to open the existing holding circuit and terminate a shift cycle and to condition the motor circuits for operation of the motor in a reverse direction during the next succeeding shift cycle.

CARL A. NERACHER.

References Cited in the file of this patent

UNITED STATES PATENTS

| Number | Name | Date |
|---|---|---|
| 1,127,581 | Batsner | Feb. 9, 1915 |
| 1,185,528 | Oddie | May 30, 1916 |
| 1,191,290 | Dillon et al. | July 18, 1916 |
| 1,219,808 | Capocefalo et al. | Mar. 20, 1917 |
| 1,268,264 | Murray | June 4, 1918 |
| 1,295,920 | Murray | Mar. 4, 1919 |
| 1,346,151 | Altick | July 13, 1920 |
| 1,594,869 | Altick | Aug. 3, 1926 |
| 1,791,502 | Hoy | Feb. 10, 1931 |
| 1,813,731 | Fleischel | July 7, 1931 |
| 1,893,644 | Fleischel | Jan. 10, 1933 |
| 1,911,599 | Bloxsom | May 30, 1933 |
| 1,993,544 | Fleischel | Mar. 5, 1935 |
| 2,013,388 | Lacey | Sept. 3, 1935 |
| 2,051,553 | Fleischel | Aug. 18, 1936 |
| 2,092,446 | Fleischel | Sept. 7, 1937 |
| 2,182,438 | Kahn | Dec. 5, 1939 |
| 2,225,493 | Barnes | Dec. 17, 1940 |
| 2,302,005 | Caves | Nov. 17, 1942 |
| 2,403,935 | Link | July 16, 1946 |
| 2,426,234 | Neracher et al. | Aug. 26, 1947 |
| 2,440,558 | Price | Apr. 27, 1948 |
| 2,444,953 | Polomski | July 13, 1948 |
| 2,462,779 | Russell | Feb. 22, 1949 |
| 2,480,801 | Wilson et al. | Aug. 30, 1949 |